United States Patent
Shellhammer et al.

(10) Patent No.: US 11,888,593 B2
(45) Date of Patent: Jan. 30, 2024

(54) SCALING AND QUANTIZATION FOR CHANNEL STATE INFORMATION REPORTING

(71) Applicant: QUALCOMM Incorporated, San Diego, CA (US)

(72) Inventors: Stephen Jay Shellhammer, Ramona, CA (US); Bin Tian, San Diego, CA (US); Alireza Raissinia, Monte Sereno, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/382,145

(22) Filed: Jul. 21, 2021

(65) Prior Publication Data

US 2023/0033864 A1 Feb. 2, 2023

(51) Int. Cl.
*H04B 7/06* (2006.01)
*H04L 25/02* (2006.01)
(Continued)

(52) U.S. Cl.
CPC ......... *H04L 5/0053* (2013.01); *H04B 17/318* (2015.01)

(58) Field of Classification Search
CPC ... H04L 5/0053; H04B 17/318; H04B 7/0621; H04B 7/0658; H04B 7/0663; H04B 7/0626
See application file for complete search history.

(56) References Cited

U.S. PATENT DOCUMENTS 10,966,102 B2 * 3/2021 Aboul-Magd ........ H04L 5/0053
11,539,413 B1 * 12/2022 Larionov ............. H04B 7/0626
(Continued)

FOREIGN PATENT DOCUMENTS

| CN | 108768602 | * 11/2018 | ......... H04L 27/2646 |
| CN | 1087686602 | * 11/2018 | ......... H04L 27/2646 |

(Continued)

OTHER PUBLICATIONS

3GPP TSG-CN2 Meeting #16, N2-010095, (Year: 2001).*
(Continued)

*Primary Examiner* — Faruk Hamza
*Assistant Examiner* — Abusayeed M Haque
(74) *Attorney, Agent, or Firm* — Arun Swain

(57) ABSTRACT

Methods, systems, and devices for wireless communications are described. A station (STA) may receive a null data packet (NDP) on a plurality of subcarriers, and the STA may generate a channel state information (CSI) matrix for each subcarrier of the plurality of subcarriers. After generating a CSI matrix for a subcarrier, such as at least one subcarrier, the STA may scale each value in the CSI matrix using a power-of-two value to minimize complexity. Specifically, instead of scaling each value in the CSI matrix to a value between zero and one using divisions (for example, which may be computationally expensive), the STA may use shifting to scale each value in the CSI matrix. The STA may then quantize the scaled values in the CSI matrix for reporting, and the STA may transmit the quantized, scaled values in the CSI matrix in a CSI report.

50 Claims, 19 Drawing Sheets

(51) Int. Cl.
*H04L 5/00* (2006.01)
*H04B 17/318* (2015.01)

(56) References Cited

U.S. PATENT DOCUMENTS

| | | | | |
|---|---|---|---|---|
| 2006/0135169 | A1* | 6/2006 | Sampath | H04W 72/542 |
| | | | | 455/450 |
| 2009/0196372 | A1* | 8/2009 | Zhang | H04L 25/0226 |
| | | | | 375/267 |
| 2012/0069927 | A1* | 3/2012 | Oyman | H04L 1/0019 |
| | | | | 375/285 |
| 2014/0093005 | A1 | 4/2014 | Xia et al. | |
| 2014/0177747 | A1 | 6/2014 | Ruiz et al. | |
| 2014/0295865 | A1 | 10/2014 | Fantaye et al. | |
| 2016/0165607 | A1* | 6/2016 | Hedayat | H04W 24/00 |
| | | | | 370/338 |
| 2017/0303276 | A1* | 10/2017 | Cheng | H04W 28/0236 |
| 2019/0253184 | A1* | 8/2019 | Xing | H04L 1/0026 |
| 2020/0280863 | A1 | 9/2020 | Cioffi et al. | |
| 2021/0307099 | A1* | 9/2021 | Ryu | H04W 76/15 |
| 2021/0399592 | A1* | 12/2021 | Peng | H04W 52/36 |
| 2022/0045783 | A1* | 2/2022 | Pedersen | H04L 1/0009 |

FOREIGN PATENT DOCUMENTS

| | | | | |
|---|---|---|---|---|
| WO | WO-2016085440 | A1 * | 6/2016 | .......... H04B 17/336 |
| WO | WO-2018083714 | A1 | 5/2018 | |
| WO | WO-2020096275 | A1 * | 5/2020 | .......... H04B 7/0626 |
| WO | WO-2021229094 | A1 * | 11/2021 | .......... H04W 28/06 |

OTHER PUBLICATIONS

3GPP TSG-CN2 Meeting #16, R2-010095, (Year: 2001).*
3GPP TSG RAN WG1 Meeting#87,R1-1613226 (Year: 2016).*
"High Throughput (RT) PRY Specification", IEEE Draft, P802. 11REVMB_D3.0, Word Conversion Clause 20, IEEE-SA, Piscatway, NJ USA vol. 802 .111, drafts, No. D3.0, Jun. 7, 2010 (Jun. 7, 2010), pp. 1-137, XP068136371, 133 Pages, Section 20.3.12.2.
Partial International Search Report—PCT/US2022/073197—ISA/EPO—dated Oct. 10, 2022 (2106275WO).
Shellhammer S., (QUALCOMM): "Low-Complexity Scaling and Quantization for CSI Report", 11-21-1573-01-00BF-Low-Complexity-Scaling-and-Quantization-for-CSI-Report, IEEE-SA, Mentor, Piscataway, NJ USA, vol. 802 . 11bf, No. 1, Oct. 18, 2021 (Oct. 18, 2021), pp. 1-20, XP068187143, The Whole Document.
International Search Report and Written Opinion—PCT/US2022/073197—ISA/EPO—dated Dec. 1, 2022 (2106275WO).

* cited by examiner

SCALING AND QUANTIZATION FOR CHANNEL STATE INFORMATION REPORTING

TECHNICAL FIELD

The following relates to wireless communications, including scaling and quantization for channel state information reporting.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, access points (APs), or one or more network access nodes, each simultaneously supporting communication for multiple communication devices, which may be otherwise known as user equipments (UEs) or stations (STAs). Some wireless communications systems may support radio frequency (RF) sensing to allow stations (STAs) or access points (APs) to gather information about other STAs. To facilitate RF sensing, an initiating device (for example, access point (AP) or station (STA)) may transmit a null data packet (NDP) to a STA across multiple subcarriers, and the STA may report measurements on the NDP in a channel state information (CSI) report. For example, the STA may generate a CSI matrix for each subcarrier of the multiple subcarriers, and the STA may include the CSI matrices for the multiple subcarriers in the CSI report. In some cases, however, the computational complexity associated with generating a CSI matrix for each subcarrier of the multiple subcarriers may be high, and this complexity may be compounded if the NDP is received on a relatively large bandwidth (for example, across many subcarriers) and across multiple spatial streams.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes receiving a null data packet on a set of multiple subcarriers of a channel, generating a channel state information matrix for each subcarrier of the set of multiple subcarriers of the channel, scaling each value in the channel state information matrix using a power-of-two value based on a determined value in the channel state information matrix, and transmitting, to a second device, a channel state information report that includes the scaled values of the channel state information matrix.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to receive a null data packet on a set of multiple subcarriers of a channel, generate a channel state information matrix for each subcarrier of the set of multiple subcarriers of the channel, scale each value in the channel state information matrix using a power-of-two value based on a determined value in the channel state information matrix, and transmit, to a second device, a channel state information report that includes the scaled values of the channel state information matrix.

One innovative aspect of the subject matter described in this disclosure can be implemented in a method for wireless communication. The method includes receiving, in a channel state information report, a first channel state information matrix for each subcarrier of a set of multiple subcarriers of a channel, converting the first channel state information matrix to a second channel state information matrix based on a power-of-two value scaling each value in the first channel state information matrix, and performing radio frequency sensing based on the second channel state information matrix.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to receive, in a channel state information report, a first channel state information matrix for each subcarrier of a set of multiple subcarriers of a channel, convert the first channel state information matrix to a second channel state information matrix based on a power-of-two value scaling each value in the first channel state information matrix, and perform radio frequency sensing based on the second channel state information matrix.

One innovative aspect of the subject matter described in this disclosure can be implemented in a method for wireless communication. The method includes receiving a null data packet at one or more receive antennas at the STA, measuring a signal strength of the null data packet received at each receive antenna of the one or more receive antennas, and transmitting, to a second device, a channel state information report including a received signal strength indicator for each receive antenna of the one or more receive antennas, the received signal strength indicator indicating the measured signal strength of the null data packet at a respective receive antenna.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to receive a null data packet at one or more receive antennas at the STA, measure a signal strength of the null data packet received at each receive antenna of the one or more receive antennas, and transmit, to a second device, a channel state information report including a received signal strength indicator for each receive antenna of the one or more receive antennas, the received signal strength indicator indicating the measured signal strength of the null data packet at a respective receive antenna.

One innovative aspect of the subject matter described in this disclosure can be implemented in a method for wireless communication. The method includes receiving a channel state information report including a received signal strength indicator indicating a received signal strength of a null data packet for each receive antenna of one or more receive antennas at an STA and performing radio frequency sensing based on the received signal strength indicator in the channel state information report.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to receive a channel state information report including a received signal strength indicator indicating a received signal strength of a null data packet for each receive antenna of one or more receive antennas at an STA and perform radio frequency sensing based on the received signal strength indicator in the channel state information report.

One innovative aspect of the subject matter described in this disclosure can be implemented in a method for wireless communication. The method includes receiving a null data packet at one or more receive antennas at the STA, measuring a total gain of one or more circuits at each receive antenna of the one or more receive antennas, and transmitting, to a second device, a channel state information report including the total gain at each receive antenna of the one or more receive antennas.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to receive a null data packet at one or more receive antennas at the STA, measure a total gain of one or more circuits at each receive antenna of the one or more receive antennas, and transmit, to a second device, a channel state information report including the total gain at each receive antenna of the one or more receive antennas.

One innovative aspect of the subject matter described in this disclosure can be implemented in a method for wireless communication. The method includes receiving a channel state information report including a total gain of one or more circuits at each receive antenna of one or more receive antennas at an STA, the total gain measured based on a null data packet and performing radio frequency sensing based on the total gain at each receive antenna in the channel state information report.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to receive a channel state information report including a total gain of one or more circuits at each receive antenna of one or more receive antennas at an STA, the total gain measured based on a null data packet and perform radio frequency sensing based on the total gain at each receive antenna in the channel state information report.

DETAILED DESCRIPTION

Figure 1:
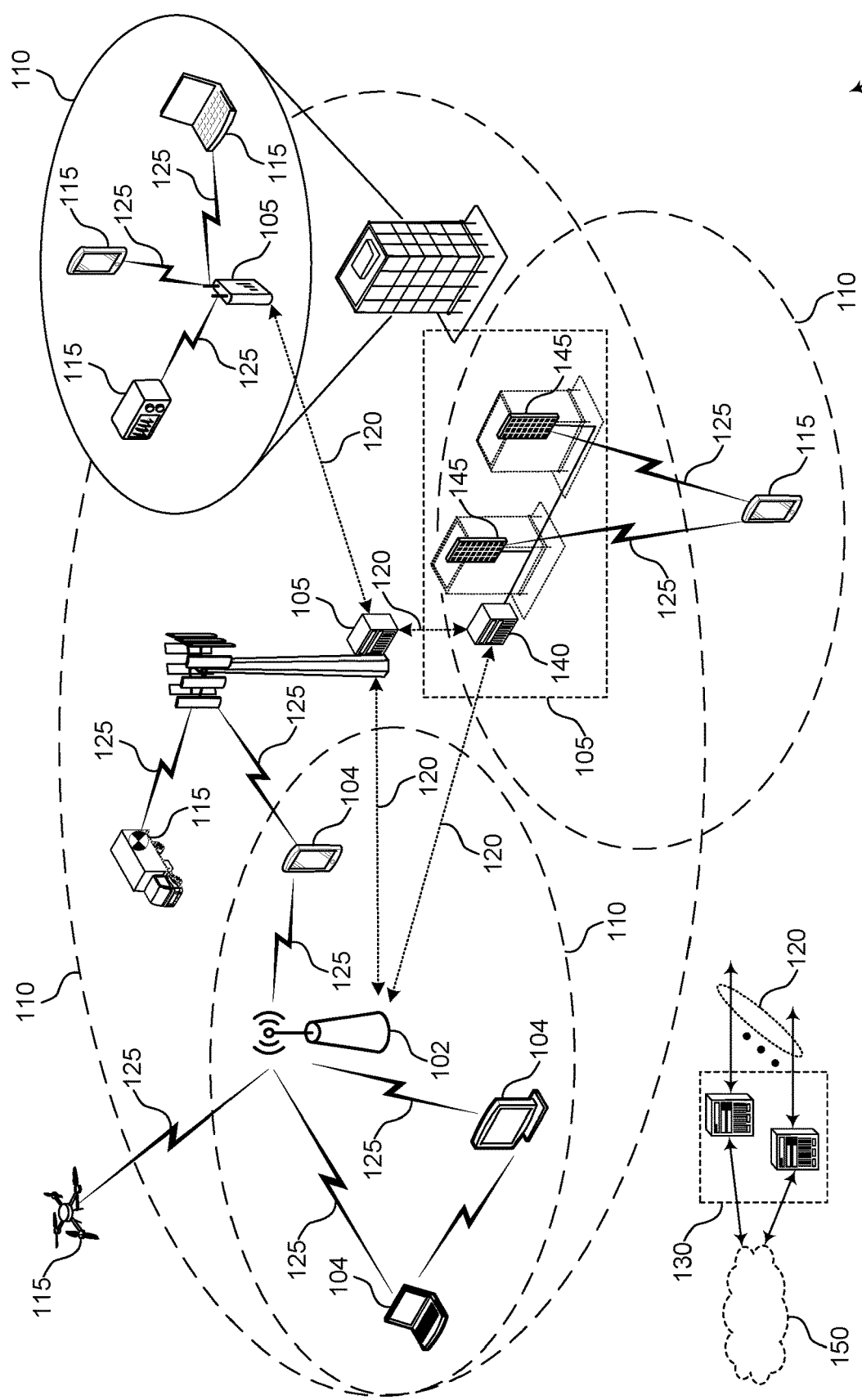
FIG. 1 illustrates an example of a wireless communications system that supports scaling and quantization for channel state information (CSI) reporting in accordance with aspects of the present disclosure.

Some wireless communications systems may support radio frequency (RF) sensing to allow stations (STAs) or access points (APs) to gather information about a local environment around the STAs or APs. An initiating device (for example, access point (AP) or station (STA)) may transmit a null data packet (NDP) to a STA across multiple subcarriers, and the STA may perform measurements on the NDP and report the measurements in a CSI report. More specifically, the STA may generate a CSI matrix for each subcarrier of the multiple subcarriers, and the STA may include CSI matrices, such as the CSI matrix for each subcarrier of the multiple subcarriers, for the multiple subcarriers in the CSI report. In some cases, to maximize a dynamic range of values in a CSI matrix and potentially increase differentiation between values in the CSI matrix, the STA may scale each value (for example, a real part and an imaginary part of each value) in the CSI matrix. In particular, the STA may scale each value in the CSI matrix to a value between zero and one using divisions, and the STA may multiply the scaled value by a value, such as a maximum value, of a quantity of bits configured for reporting each value in the CSI matrix. In such cases, however, the computational complexity of generating the CSI matrix for each subcarrier may be significant, and this computational complexity may be compounded if the NDP is received on a relatively large bandwidth (for example, across many subcarriers) and across multiple spatial streams. As a result, there may be significant power consumption at the STA and high latency for reporting CSI feedback, among other challenges.

Various aspects of the present disclosure relate to channel state information (CSI) reporting to facilitate radio frequency (RF) sensing. After generating a CSI matrix for a subcarrier, a STA may scale each value in the CSI matrix using a power-of-two value to relatively minimize implementation complexity. Specifically, instead of scaling each value in the CSI matrix to a value between zero and one using divisions (for example, which may be computationally expensive), the STA may use binary shifting to scale each value in the CSI matrix. The STA may then quantize each scaled value in the CSI matrix for reporting, and the STA may transmit the quantized values in the CSI matrix in a CSI report. In some implementations, the STA may also transmit an indication of a value for a device receiving the CSI report (for example, an AP or another STA) to use to generate another CSI matrix, such as an original CSI matrix, from a received CSI matrix. The original CSI matrix may refer to the CSI matrix at the STA before values in the CSI matrix are scaled and quantized. In addition to the techniques described above to facilitate efficient scaling, a STA may also support techniques for including additional information in the CSI report to improve RF sensing. As an example, the STA may include a received signal strength indicator (RSSI), a total gain, or both in the CSI report for each receive antenna at the STA at which the NDP is received.

Particular aspects of the subject matter described in this disclosure may be implemented to realize one or more of the following potential advantages. The techniques employed by the described communication devices may facilitate RF sensing or other applications that require or benefit from CSI reporting. In some aspects, operations performed by the described communication devices provide an improved scaling operation for CSI reporting that may be used for RF sensing. In some such aspects, the STAs supporting CSI reporting may utilize the techniques described herein to minimize or otherwise reduce the implementation complexity associated with scaling values in a CSI matrix, which may result in reduced processing times as well as power savings and lower latency for reporting CSI feedback. In some other aspects, operations performed by the described communication devices may provide improvements to CSI reporting itself. In some such aspects, the STAs supporting CSI reporting may utilize the techniques described herein to include additional information in the CSI report to improve RF sensing with relatively lower, for example minimal, overhead.

Aspects of the disclosure are initially described in the context of wireless communications systems. Examples of processes and signaling exchanges that support scaling and quantization for CSI reporting are then described. Aspects of the disclosure are further illustrated by and described with reference to apparatus diagrams, system diagrams, and flowcharts that relate to scaling and quantization for CSI reporting.

FIG. 1 illustrates an example of a wireless communications system 100 that supports scaling and quantization for CSI reporting in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

In some systems, the D2D communication link may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

According to some aspects, the wireless communication system 100 may include a wireless local area network (WLAN) such as a Wi-Fi network. The WLAN may be a network implementing at least one of the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). The WLAN may include numerous wireless communication devices such as an AP 102 and multiple stations (STAs) 115. While only one AP 102 is shown, the WLAN network also can include multiple APs 102.

Each of the STAs 115 also may be referred to as a UE 115, a LAN client, a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), SU-MIMO and MU-MIMO. The described implementations also can be implemented using other wireless communication protocols or RF signals suitable for use in one or more of a wireless personal area network (WPAN), a WLAN, a wireless wide area network (WWAN), or an internet of things (JOT) network.

In wireless communications system 100, a STA 115 may support CSI reporting to report channel state feedback to an access point (AP) 105. In some examples, the STA 115 may transmit a CSI report as a MAC report in a high throughput scenario. The STA 115 may also transmit a signal-to-noise ratio (SNR) for each receive chain at the STA 115. In other examples, the UE 115 may transmit a CSI report to provide feedback for RF sensing. RF sensing may refer to a technique for making observations of an environment. These observations may include a location of a person in a room, whether a person is present in a room, which room a person is located in, a breathing rate or heart rate of a person in a room, etc. To facilitate RF sensing, one STA 115 or an AP 102 may transmit a signal (for example, an NDP), and one or more other STAs 115 may observe a channel response from the transmission. By measuring a sequence of these channel responses, the STA 115 or the AP 102 may make observations of the environment.

If generating the CSI report for transmission, a STA 115 may generate a CSI matrix for each subcarrier on which the NDP is received. Each value in the CSI matrix may include a real part (for example, an in-phase part (I)) and an imaginary part (for example, a quadrature part(Q)). The STA 115 may receive a control message (for example, MIMO control field) indicating a number of bits for the real part or the imaginary part of each value in the CSI matrix, a number of columns to include in the CSI matrix, and a number of rows to include in the CSI matrix. Table 1 illustrates an example of parameters signaled to the STA 115:

TABLE 1

CSI field parameters

| CSI Field Parameters | Meaning | Where indicated | Range of values |
|---|---|---|---|
| Number of bits (Nb) | Number of bits for I or Q | MIMO control field | {4, 5, 6, 8. 16} |
| Number of columns (Nc) | Number of columns | MIMO control field | 0 to 3 |
| Number of rows (Nr) | Number of rows | MIMO control field | 1 to 4 |

In some implementations, a process used for constructing a CSI report including multiple CSI matrices may involve complex calculations over the multiple CSI matrices. For instance, a STA 115 may perform a large number division operations if generating a CSI matrix for each subcarrier to include in the CSI report. These calculations may add up in terms of implementation complexity. In addition, if wider bandwidths and more spatial streams may be supported for a CSI report (for example, if a STA 115 is to generate a CSI report based on an NDP received on a large bandwidth over multiple spatial streams), the complexity of generating the CSI may further increase (for example, since the STA 115 may generate a CSI matrix for each subcarrier in the large bandwidth). Wireless communications system 100 may support a low-complexity process for constructing a CSI report that may eliminate one or more complex calculations. Because the low complexity process (or procedure) may be performed using less processing, power consumption and latency associated with CSI reporting may be reduced (for example, such that construction of a CSI report may be implemented in software).

Figure 2:
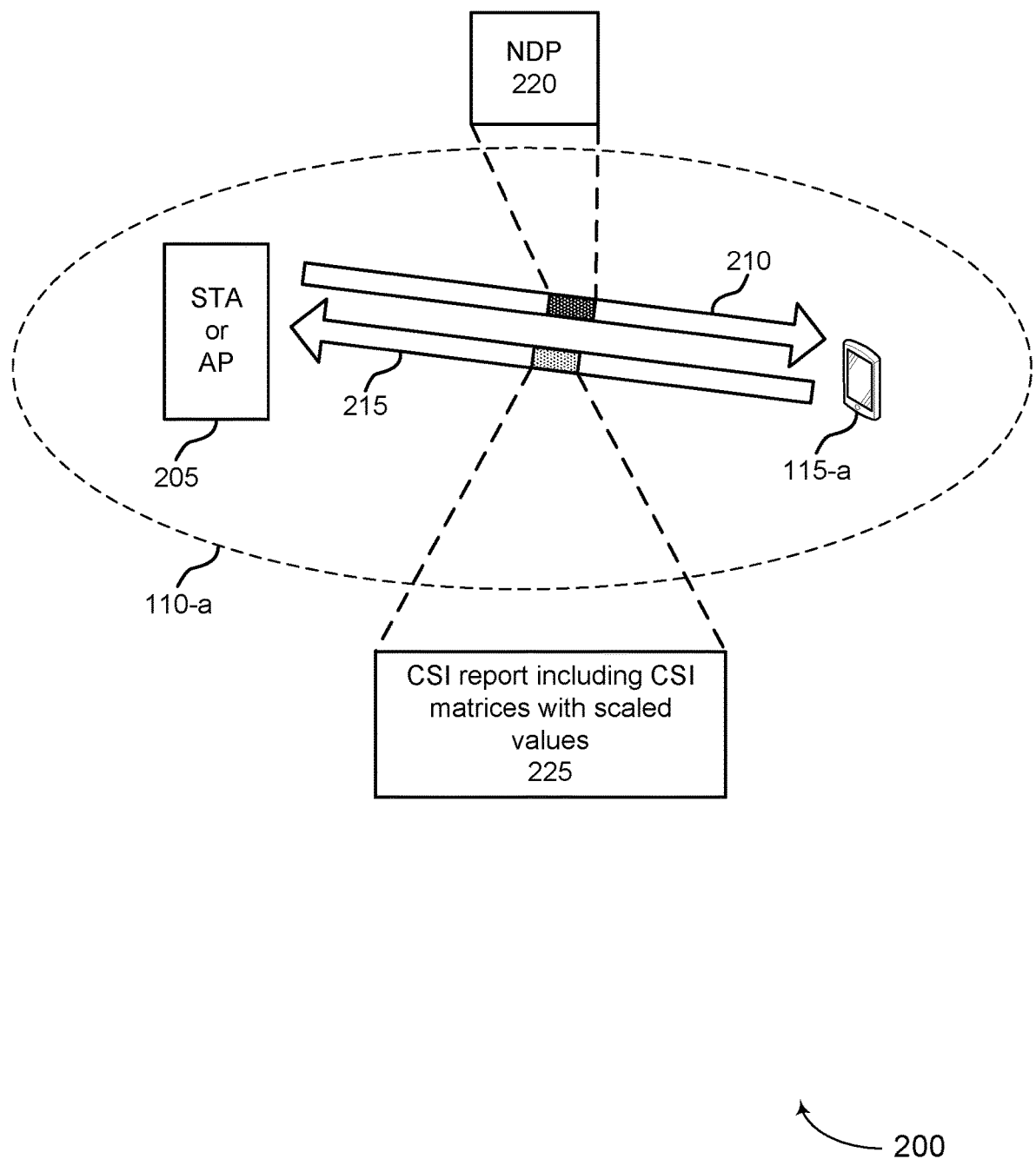
FIG. 2 illustrates an example of a wireless communications system that supports scaling and quantization for CSI reporting in accordance with aspects of the present disclosure.

FIG. 2 illustrates an example of a wireless communications system 200 that supports scaling and quantization for CSI reporting in accordance with aspects of the present disclosure. The wireless communications system 200 includes a STA 115, which may be an example of a STA 115 described with reference to FIG. 1. The wireless communications system 200 also includes a STA or AP 205, which may be an example of a STA 115 or an AP 102 described with reference to FIG. 1. The STA 115-a may communicate with the STA or AP 205 on resources of a carrier 210 and a carrier 215 (for example, which may correspond to the same or different carriers). The wireless communications system 200 may implement aspects of the wireless communications system 100.

The STA 115-a may receive an NDP 220 from the STA or AP 205 or from another device (for example, a device initiating RF sensing) on multiple subcarriers, and the STA may generate a CSI matrix for each subcarrier of the multiple subcarriers. The techniques described herein may also be applicable using another packet in place of the NDP 220 (e.g., a data physical layer protocol data unit (PPDU) or an ACK). A maximum size of a CSI matrix may be 4×4 or 8×8, and each value or element in the CSI matrix may be a complex number. In some implementations, a CSI matrix may be a non-square matrix. For example, if the STA or AP 205 transmits two spatial streams to the STA 115-a, and the STA 115-a has four receive antennas, then a CSI matrix may be a 2×4 matrix. A real part of a value (for example, a real value) in the CSI matrix may be referred to as an in-phase (I) part or value and an imaginary part of the value (for example, an imaginary value) in the CSI matrix may be referred to as a quadrature (Q) part or value. In some examples, the real part may be symbolized using "R" and the imaginary part may be symbolized using "I" (for example, in formulas including the real and imaginary parts). The STA 115-a may perform measurements on the NDP 220 on each subcarrier, and the STA 115-a may generate a CSI matrix for a subcarrier based on the measurements performed on the subcarrier such that the values in the CSI matrix indicate a channel state of the subcarrier.

After populating each CSI matrix with values representing a channel state of a respective subcarrier, the STA 115-a may scale each value in each CSI matrix. The STA 115 may begin with determining, such as calculating, a scaling factor for each subcarrier by finding a largest real or imaginary value in a CSI matrix for that subcarrier (for example, in terms of an absolute value). That is, the scaling factor may be a largest real or imaginary absolute value in a CSI matrix, H, for that subcarrier. The STA 115 may then scale each value in the CSI matrix to a number less than or equal to one by dividing by the scaling factor. The STA 115 may also convert each value in the CSI matrix to dB, quantize each value, and convert each value back to a linear scale. Once each value in the CSI matrix is scaled and quantized, the STA 115 may transmit the CSI report 225 that includes the scaled and quantized values in the CSI matrix.

In some examples, the STA 115-*a* may determine, such as calculate, the scaling factor using Equation 1 below:

$$m_H(k) = \max\{\max\{|\text{Re}(H_{\text{eff}(m,l)}(k))|_{m=1,l=1}^{m=N_r,l=N_c}\}, \max\{|\text{Im}(H_{\text{eff}(m,l)}(k))|_{m=1,l=1}^{m=N_r,l=N_c}\}\} \quad (1)$$

In some examples, a scaling ratio (in dB) may be a ratio of a largest value over all subcarriers to the subcarrier associated with CSI matrix, H (for example, in which $N_{SR}$ depicts a quantity of the subcarriers). The scaling ratio may be an integer value between 0 and 3 and may be given by Equation 2 below:

$$M_H(k) = \min\left\{7, \left\lfloor 20\log_{10}\left(\frac{\max\{m_H(z)\}_{z=-N_{SR}}^{z=N_{SR}}}{m_H(k)}\right)\right\rfloor\right\} \quad (2)$$

A linear scaling factor may be given by Equation 3 below:

$$M_H^{lin}(k) = \frac{\max\{m_H(z)\}_{z=-N_{SR}}^{z=N_{SR}}}{10^{M_H(k)/20}} \quad (3)$$

Each real (for example, in-phase) and imaginary (for example, quadrature) value may be scaled to a two's complement value as follows in Equations 4 and 5 below:

$$H_{\text{eff}(m,l)}^{q(R)}(k) = \left\lfloor \frac{\text{Re}\{H_{\text{eff}(m,l)}(k)\}}{M_H^{lin}(k)}(2^{N_b-1} - 1) + 0.5 \right\rfloor \quad (4)$$

$$H_{\text{eff}(m,l)}^{q(I)}(k) = \left\lfloor \frac{\text{Im}\{H_{\text{eff}(m,l)}(k)\}}{M_H^{lin}(k)}(2^{N_b-1} - 1) + 0.5 \right\rfloor \quad (5)$$

In some implementations, it may be appropriate to scale the real and imaginary parts of the values in CSI matrices for construction of the CSI report 225 to maximize a dynamic range of values in each CSI matrix. A scaling factor, $M_H(k)$, may be a 3-bit field, measured in dB and may be provided for each CSI matrix associated with a given subcarrier (for example, in which it may be possible to apply a value $N_g$ to reduce a quantity of the subcarriers). The scaling factor may be converted from dB to linear, and the STA 115 may use the linear scaling factor to scale CSI values in a CSI matrix before transmitting. In some cases, however, the CSI reporting process may involve several high-complexity operations. These high-complexity operations may include a conversion from linear to dB in the determination of the scale factor transmitted in the CSI report 225, a conversion from dB back to linear to use in quantizing, and a division by the scaling factor prior to quantization.

The wireless communications system 200 may support efficient techniques for CSI reporting to facilitate RF sensing with minimal complexity at the STA 115-*a*. Instead of using division operations for scaling values in a CSI matrix, the STA 115-*a* may use binary shift operations to scale the values in the CSI matrix. The binary shift operations may be significantly less complex than the division operations. In some implementations, real and imaginary values generated at the STA 115-*a* (for example, a receiver of the NDP 220) in a CSI matrix may have a word size of $N_p$ bits and may be in a two's complement format (for example, in which $N_p$ may be vendor-specific). Further, a transmitted word size for real and imaginary values in the CSI matrix may be depicted as $N_b$, in which the value of $N_b$ may be specified by a format of the CSI report 225.

The STA 115-*a* may determine, such as calculate, a largest real or imaginary value in a CSI matrix (for example, for each subcarrier) according to Equation 1 using an efficient algorithm for finding the maximum of a list of numbers. The largest positive value that can be represented with an $N_p$ two's complement format may be $2^{N_p-1}-1$. The STA 115-*a* may then select a power-of-two value for scaling values in the CSI matrix based on the largest real or imaginary value in the CSI matrix. The power-of-two value may be represented as alpha ($\alpha$), in which $\alpha=2^r$. The STA 115 may choose the value such that a scaled value of $m_H(k)$ is less than or equal to a largest positive value and larger than or equal to $2^{(N_p-2)}$. That is, the scaling factor may be a maximum power-of-two scaling factor which can be applied while avoiding an overflow. In some examples, the STA 115-*a* may select the scaling factor alpha in accordance with Equation 6 below:

$$(2^{(N_p-1)}-1) \leq \alpha m_H(k) \leq 2^{(N_p-2)} \quad (6)$$

After scaling, the STA 115 may quantize the real and imaginary parts of the values in the CSI matrix to a word size of $N_b$ bits. Equations 7 and 8 below show example operations for quantizing the real and imaginary parts of the values in the CSI matrix. In some implementations, the STA 115-*a* may quantize the values in the CSI matrix using shifting and rounding operations (for example, either in hardware or software).

$$H_{\text{eff}(m,l)}^{q(R)} = \lfloor \alpha \text{Re}\{(H_{\text{eff}(m,l)}(k)\}(2^{(N_b-N_p)})0.5 \rfloor \quad (7)$$

$$H_{\text{eff}(m,l)}^{q(I)} = \lfloor \alpha \text{Im}\{(H_{\text{eff}(m,l)}(k)\}(2^{(N_b-N_p)})0.5 \rfloor \quad (8)$$

In addition to scaling and quantizing the values in a CSI matrix based on a power-of-two value, the STA 115-*a* may indicate a value for the AP or STA 205 to use to reconstruct values in the CSI matrix (for example, to generate the values in the CSI matrix before scaling). For instance, it may be appropriate to reconstruct a value of an original CSI measurement as well as possible (for example, given some small rounding errors). In some examples, the STA 205 may provide a conversion scaling factor to the AP or STA 205 to reconstruct the original CSI values. The conversion scaling factor may be expressed as an exponent of two, s, that is applied to convert values from a transmitted CSI matrix to values in an original CSI matrix (for example, with minor rounding errors). The value of s may be either positive, negative, or zero depending on the scaling factor used by the STA 115-*a* for scaling (for example, the power-of-two value), a word size ($N_p$) of values in an original CSI matrix (for example, a CSI matrix generated at the STA 115-*a*), and a word size ($N_b$) of values in the CSI matrix included in CSI report 225. Further, the STA 115-*a* may indicate the value of s using a three-bit or four-bit field (for example, to cover a dynamic range). The exponent of two may be given by Equation 9 below:

$$s = (N_p - N_b) - r \quad (9)$$

A STA 115-*a* may use the techniques described above for scaling and quantizing CSI matrices of different sizes to minimize computational complexity at the STA 115-*a*. As an example, the STA 115-*a* may scale values in a CSI matrix of size 2×2 such that the CSI matrix includes a total of eight values (in other words, four real values and four imaginary values). In this example, the original CSI word size may be 16 bits, and a CSI word size in the CSI report 225 may be 12 bits.

In one implementation of this example, the STA 115-*a* may determine to use a scaling factor of one (for example, r=0 and α=2⁰=1) for scaling a CSI matrix. That is, full dynamic range may be maintained with no scaling. The STA 115-*a* may also provide an s value of four to the receiving AP or STA 205 to allow the receiving AP or STA 205 to reconstruct the CSI in the CSI matrix. The STA 115-*a* may determine, such as calculate, the value of s as follows: s−p−b−r=16−12−0=4, and the receiving AP or STA 205 may reconstruct the original CSI by multiplying by $2^4$ (for example, since the s value corresponds to an exponent of two). The STA 115-*a* may scale and quantize values in a CSI matrix depicted in Table 2 to generate the values in the CSI matrix depicted in Table 3.

TABLE 2

Integer and bit-level representation of values in an original CSI matrix

| I/Q values (integer) | I/Q values (Bit-level) |
|---|---|
| 21796 | {0, 1, 0, 1, 0, 1, 0, 1, 0, 0, 1, 0, 0, 1, 0, 0} |
| 1512 | {0, 0, 0, 0, 0, 1, 0, 1, 1, 1, 1, 0, 1, 0, 0, 0} |
| 24085 | {0, 1, 0, 1, 1, 1, 1, 0, 0, 0, 0, 1, 0, 1, 0, 1} |
| −8763 | {1, 1, 0, 1, 1, 1, 0, 1, 1, 1, 0, 0, 0, 1, 0, 1} |
| −6788 | {1, 1, 1, 0, 0, 0, 1, 0, 1, 0, 1, 1, 1, 1, 0, 0} |
| −12781 | {1, 1, 0, 0, 1, 1, 1, 1, 0, 0, 0, 0, 1, 0, 0, 1, 1} |
| 9202 | {0, 0, 1, 0, 0, 0, 0, 1, 1, 1, 1, 1, 1, 0, 0, 1, 0} |
| −30367 | {1, 0, 0, 0, 1, 0, 0, 1, 0, 1, 1, 0, 0, 0, 0, 1} |

TABLE 2

Integer and bit-level representation of values in a reported CSI matrix

| I/Q values (integer) | I/Q values (Bit-level) |
|---|---|
| 1362 | {0, 1, 0, 1, 0, 1, 0, 1, 0, 0, 1, 0} |
| 94 | {0, 0, 0, 0, 0, 1, 0, 1, 1, 1, 1, 0} |
| 1505 | {0, 1, 0, 1, 1, 1, 1, 0, 0, 0, 0, 1} |
| −547 | {1, 1, 0, 1, 1, 1, 0, 1, 1, 1, 0, 1} |
| −424 | {1, 1, 1, 0, 0, 1, 0, 1, 1, 0, 0, 0} |
| −798 | {1, 1, 0, 0, 1, 1, 1, 0, 0, 0, 1, 0} |
| 575 | {0, 0, 1, 0, 0, 0, 1, 1, 1, 1, 1, 1} |
| −1897 | {1, 0, 0, 0, 1, 0, 0, 1, 0, 1, 1, 1} |

In another implementation of this example, the STA 115-*a* may determine to use a scaling factor of four (for example, r=2 and α=2²=4) for scaling a CSI matrix. That is, it may be appropriate to scale the values in the CSI matrix to maintain full dynamic range. The STA 115-*a* may also provide an s value of two to the receiving AP or STA 205 to allow the receiving AP or STA 205 to reconstruct the CSI in the CSI matrix. The STA 115-*a* may determine, such as calculate, the value of s as follows: s−p−b−r=16−12−2=2, and the receiving AP or STA 205 may reconstruct the original CSI by multiplying by $2^2$ (for example, since the s value corresponds to an exponent of two). The STA 115-*a* may scale and quantize values in a CSI matrix depicted in Table 4 to generate the values in the CSI matrix depicted in Table 5.

TABLE 4

Integer and bit-level representation of values in an original CSI matrix

| I/Q values (integer) | I/Q values (Bit-level) |
|---|---|
| −4492 | {1, 1, 1, 0, 1, 1, 1, 0, 0, 1, 1, 1, 0, 1, 0, 0} |
| −1788 | {1, 1, 1, 1, 1, 0, 0, 1, 0, 0, 0, 0, 0, 1, 0, 0} |

TABLE 4-continued

Integer and bit-level representation of values in an original CSI matrix

| I/Q values (integer) | I/Q values (Bit-level) |
|---|---|
| 3456 | {0, 0, 0, 0, 1, 1, 0, 1, 1, 0, 0, 0, 0, 0, 0} |
| 2651 | {0, 0, 0, 0, 1, 0, 1, 0, 0, 1, 0, 1, 1, 0, 1, 1} |
| 2398 | {0, 0, 0, 0, 1, 0, 0, 1, 0, 1, 0, 1, 1, 1, 1, 0} |
| −4602 | {1, 1, 1, 0, 1, 1, 1, 1, 0, 0, 0, 0, 0, 1, 1, 0} |
| 1905 | {0, 0, 0, 0, 0, 1, 1, 1, 0, 1, 1, 1, 0, 0, 0, 1} |
| 2512 | {0, 0, 0, 0, 1, 0, 0, 1, 1, 1, 0, 1, 0, 0, 0, 0} |

TABLE 5

Integer and bit-level representation of values in a reported CSI matrix

| I/Q values (integer) | I/Q values (Bit-level) |
|---|---|
| −1122 | {1, 0, 1, 1, 1, 0, 0, 1, 1, 1, 1, 0} |
| −447 | {1, 1, 1, 0, 0, 1, 0, 0, 0, 0, 0, 1} |
| 864 | {0, 0, 1, 1, 0, 1, 1, 0, 0, 0, 0, 0} |
| 662 | {0, 0, 1, 0, 1, 0, 0, 1, 0, 1, 1, 0} |
| 599 | {0, 0, 1, 0, 0, 1, 0, 1, 0, 1, 1, 1} |
| −1150 | {1, 0, 1, 1, 1, 0, 0, 0, 0, 0, 1, 0} |
| 476 | {0, 0, 0, 1, 1, 1, 0, 1, 1, 1, 0, 0} |
| 628 | {0, 0, 1, 0, 0, 1, 1, 1, 0, 1, 0, 0} |

In some examples, the STA 115-*a* may perform scaling using divisions, such that a scaled version of $m_H(k)$ is a largest possible positive value. In some implementations, the STA 115-*a* may perform scaling using binary shifting by a power-of-two value, such that the scaled version of $m_H(k)$ is between the largest possible positive value and half of the largest possible value. Thus, scaling using the power-of-two value may result in losing half a bit of resolution. In some examples, if a format of the CSI report 225 allocates 16 bits for real values and 16 bits for imaginary values, scaling using the power-of-two value may result in effectively using 15.5 bits for the real values and 15.5 bits for the imaginary values. However, scaling using the power-of-two value may result in lower complexity (for example, in exchange for the half a bit of resolution). Specifically, scaling using the power-of-two value may result in eliminating the conversion from linear to dB, the conversion from dB back to linear, and the division by the scaling factor (for example, replacing the division with shifting). The resulting reduction in complexity may cost half a bit of resolution, which, for example, may be negligible for examples in which a large word size is used (for example, 16 bit).

Figure 3:
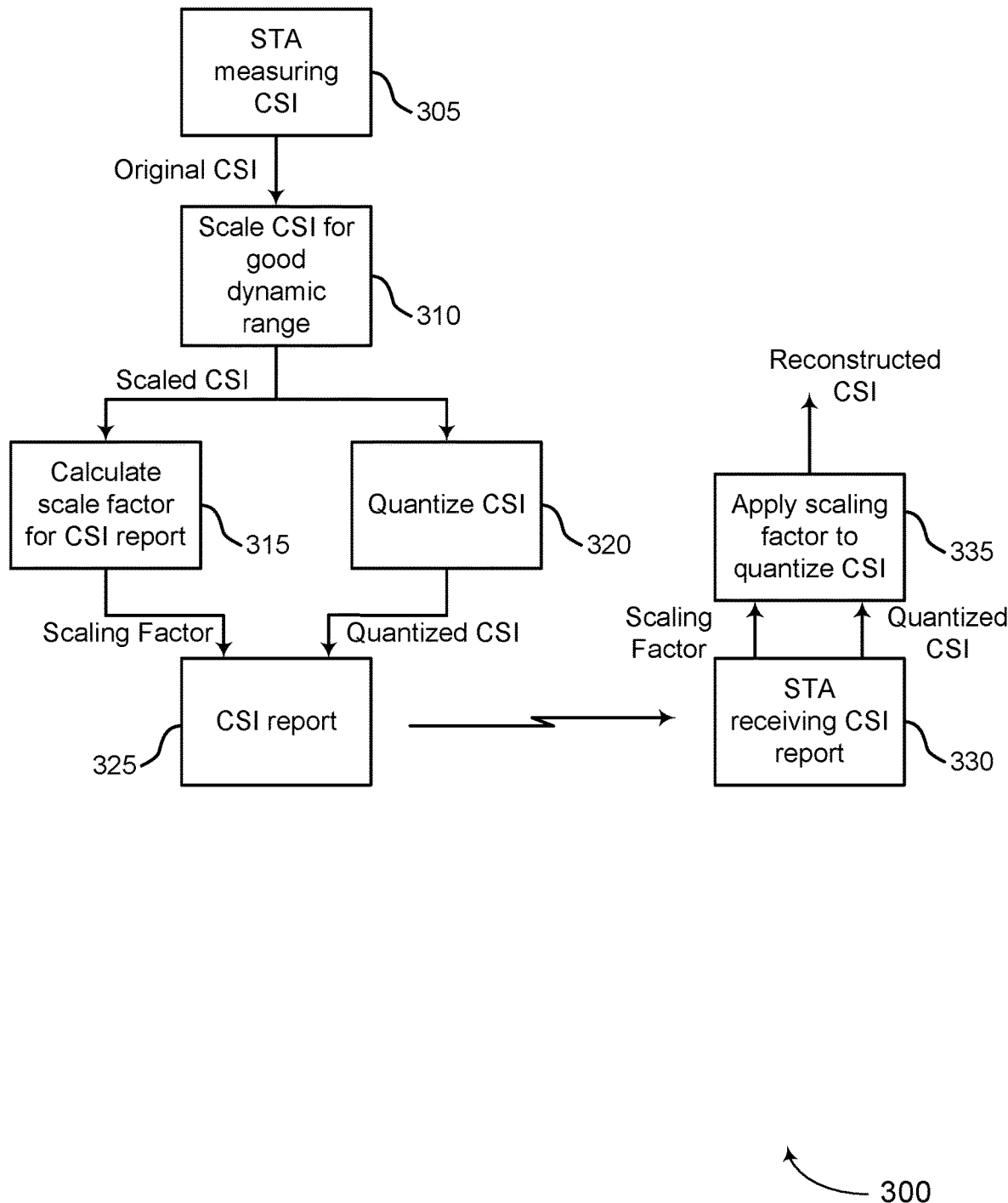
FIG. 3 illustrates an example of a flowchart that supports scaling and quantization for CSI reporting in accordance with aspects of the present disclosure.

FIG. 3 illustrates an example of a flowchart 300 that supports scaling and quantization for CSI reporting in accordance with aspects of the present disclosure. A STA 115 may receive an NDP on multiple subcarriers, and, at 305, the STA 115 may measure a channel state and generate CSI based on the NDP. The STA 115 may generate a CSI matrix for each subcarrier of the multiple subcarriers. After generating a CSI matrix for a subcarrier, the STA 115 may scale values in the CSI matrix to maximize a dynamic range of values in the CSI matrix. The STA 115 may scale each value in the CSI matrix using a power-of-two value based on a maximum value in the CSI matrix. For instance, the STA 115 may shift a real and an imaginary part of each value in the CSI matrix by the power-of-two value. In some examples, the STA 115 may scale each value in the CSI matrix using the power-of-two value such that a real and an imaginary part of each scaled value of the CSI matrix is less than a largest positive value of a binary word having a word size (p) configured for the CSI matrix and greater than half of the largest positive value of the binary word.

At 315, the STA 115 may determine, such as calculate, a conversion scaling factor for a receiving STA 115 or AP 102 to use to convert the CSI matrix to be transmitted to an original CSI matrix. At 320, the STA 115 may quantize the values (for example, a real and imaginary part of each value) in the CSI matrix. At 325, the STA 115 may transmit a CSI report that includes the scaled values of the CSI matrix. The STA 115 may also transmit an indication of a conversion scaling factor for the receiving STA 115 or AP 102 to use to convert the CSI matrix in the CSI report to the original CSI matrix (for example, an original CSI matrix before scaling and quantization). The conversion scaling factor may be the scaling factor used by the STA 115-a to scale values in the CSI matrix or may be another value, and the STA 115 may indicate the conversion scaling factor in the CSI report. The conversion scaling factor may be based on a word size configured for the CSI matrix (p), a word size configured for a format of the CSI report (b), and the power-of-two value used to scale each value in the CSI matrix. At 330, the receiving STA 115 or AP 102 may receive the CSI report including the CSI matrix, and, at 335, the receiving STA 115 or AP 102 may apply the conversion scaling factor to convert the CSI matrix to the generated or original CSI matrix. The receiving STA 115 or AP 102 may convert each CSI matrix in the CSI report using the conversion scaling factor until the CSI in the CSI report is reconstructed.

In addition to the described techniques for scaling values in a CSI matrix, the STA 115-a in wireless communications system 200 may also support techniques for including additional information in a CSI report to improve RF sensing.

Figure 4:
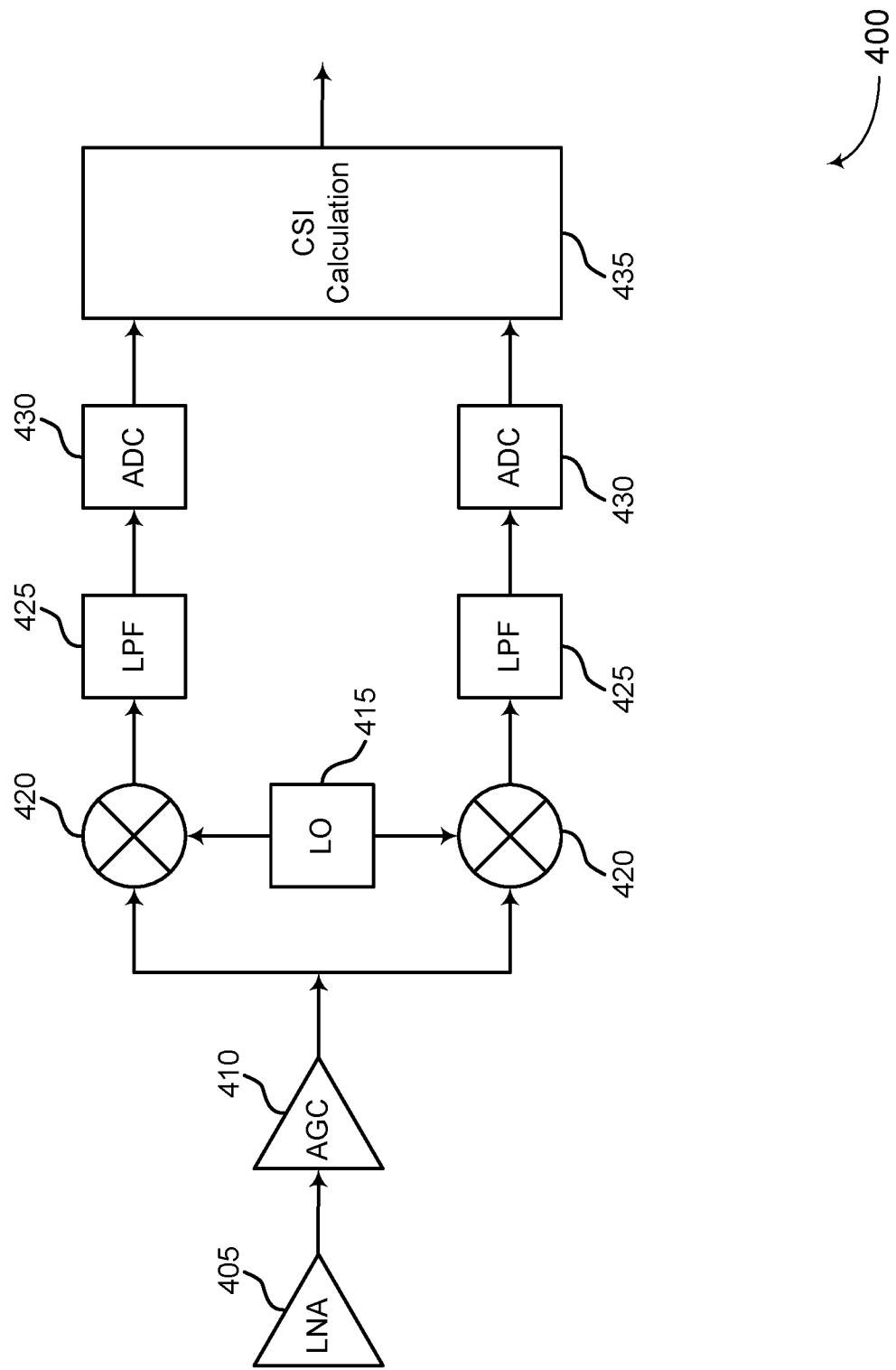
FIG. 4 illustrates an example of circuits used to process a received waveform in accordance with aspects of the present disclosure.

In some implementations, CSI values may not directly indicate a power level at a receiver. At each receive antenna at the STA 115-a, there may be a number of circuits that process a received waveform, and each circuit may provide a gain factor for the received waveform. FIG. 4 illustrates an example of circuits 400 used to process a received waveform in accordance with aspects of the present disclosure. The STA 115-a may include a low-noise amplifier (LNA) 405, automatic gain control (AGC) circuit 410, a local oscillator (LO), mixers 420, low-pass filters (LPFs) 425, and analog-to-digital convertors (ADCs) 430. The STA 115-a may also include a CSI calculation 435 entity for determining, such as calculating, values to include in a CSI report (for example, supporting digital processing for generating CSI values).

In some aspects, it may be appropriate to provide additional values in a CSI report such that a receiving device may have power levels at each receive antenna at the STA 115-a generating the CSI report. The receiving device may then combine these additional values with other reported CSI values to perform RF sensing.

In one example, the STA 115-a may measure a received signal strength of the NDP 220 at each receive antenna at the STA 115-a, and the STA 115-a may report a received signal strength indicator (RSSI) for each receive antenna in the CSI report 225 (for example, RF sensing report). The STA or AP 205 may receive the CSI report 225 and use the per-antenna RSSI values in the CSI report, the complete set of scaled and quantized CSI values, and a scaling factor to perform RF sensing. The STA 115-a may report the RSSI for each receive antenna in dBm with some specified resolution and accuracy.

In another example, the STA 115-a may measure a total gain through processing circuits at each receive antenna at the STA 115-a based on the NDP 220, and the STA 115-a may report the total gain for each receive antenna in the CSI report 225. For instance, each circuit in a receive chain at each receive antenna may have some gain, and the gain may be represented in dB and added together to get the total gain through the receive chain. Then, for each receive antenna at the STA 115-a, the total gain for each receive chain may be included in the CSI report 225. The STA 115-a may report the total gain of a receive chain in dB with some specified resolution and accuracy.

In yet another example, the STA 115-a may measure a received signal strength of the NDP 220 at each receive antenna at the STA 115-a and measure a total gain through processing circuits at each receive antenna at the STA 115-a based on the NDP 220. The STA 115-a may then report the RSSI for each receive antenna and the total gain for each receive antenna in the CSI report 225. Because the RSSI, total gain, or both for each receive antenna may be a small amount of data compared to the CSI report 225 for each subcarrier, the inclusion of the RSSI, total gain, or both may not significantly increase the size of the CSI report 225.

Figure 5:
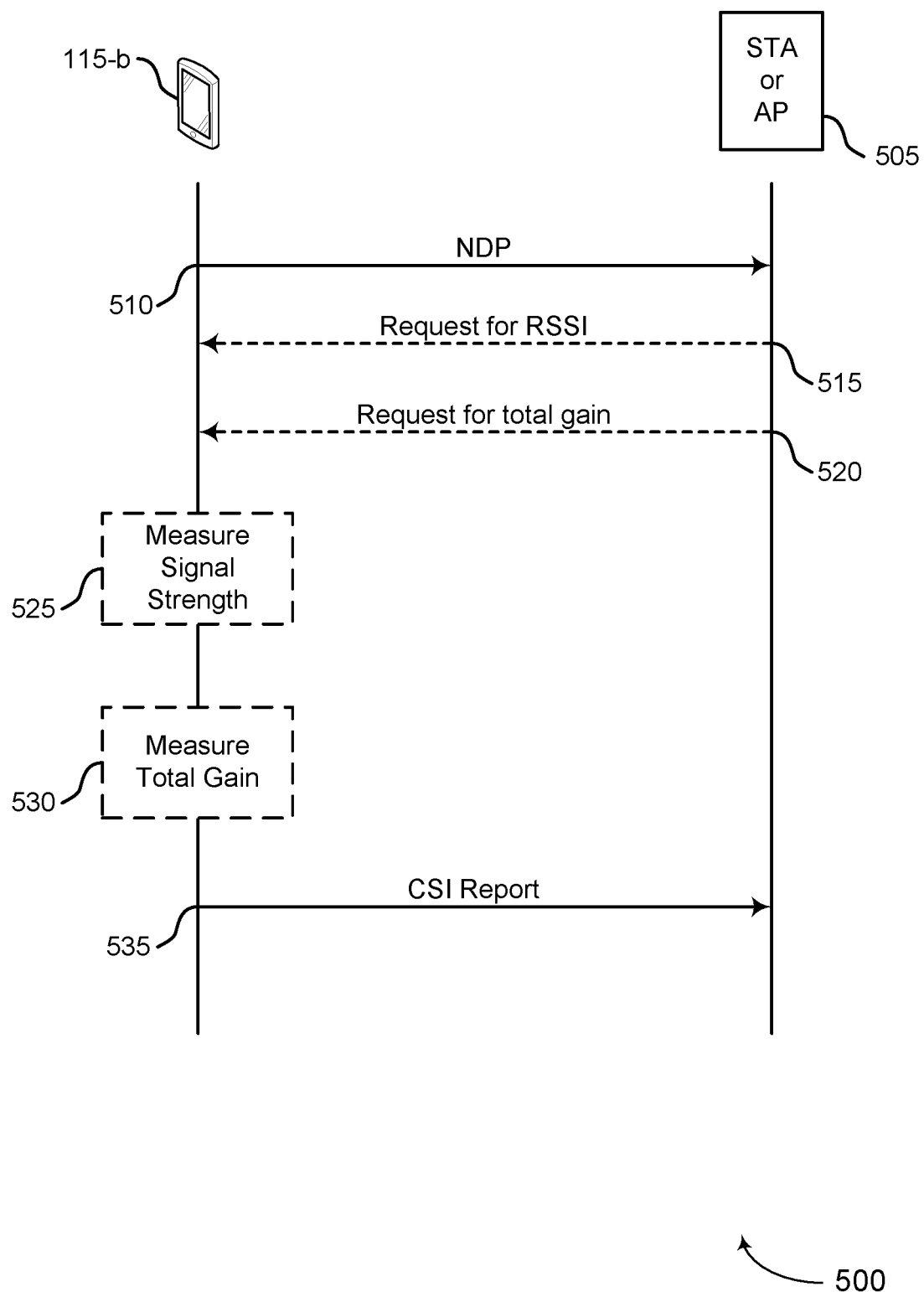
FIG. 5 illustrates an example of a process flow that supports scaling and quantization for CSI reporting in accordance with aspects of the present disclosure.

FIG. 5 illustrates an example of a process flow 500 that supports scaling and quantization for CSI reporting in accordance with aspects of the present disclosure. The process flow 500 includes a STA 115-b, which may be an example of a STA 115 described with reference to FIGS. 1-5. The process flow 500 also includes an AP or STA 505, which may be an example of a STA 115 or an AP 102 described with reference to FIGS. 1-4. The process flow 500 may implement aspects of wireless communications system 200. For example, the process flow 500 may support techniques for including additional information in a CSI report to improve RF sensing.

In the following description of the process flow 500, the signaling exchanged between the STA 115-b and the STA or AP 505 may be exchanged in a different order than the example order shown, or the operations performed by the STA 115-b and the STA or AP 505 may be performed in different orders or at different times. Some operations may also be omitted from the process flow 500, and other operations may be added to the process flow 500.

At 510, the STA 115-b may receive an NDP at one or more receive antennas at the STA. The STA 115-b may receive the NDP from the STA or AP 505 or from another device. At 515, the STA 115-b may receive a request to transmit an RSSI in a CSI report. At 520, the STA 115-b may receive a request to transmit a total gain at each receive antenna in the CSI report. At 525, the STA 115-b may measure a signal strength of the NDP received at each receive antenna of the one or more receive antennas at the STA 115-b. At 530, the STA 115-b may measure a total gain of one or more circuits at each receive antenna of the one or more receive antennas at the STA 115-b. At 535, the STA 115-b may transmit a CSI report including the RSSI, total gain, or both for each receive antenna at the STA 115-b (for example, in response to the request at 515, the request at 520, or both). The STA 115-b may transmit the CSI report to the STA or AP 505 or to another device. The STA or AP 505 or the other device may then perform RF sensing based on the CSI report (for example, using the RSSI, total gain, or both for each receive antenna).

Figure 6:
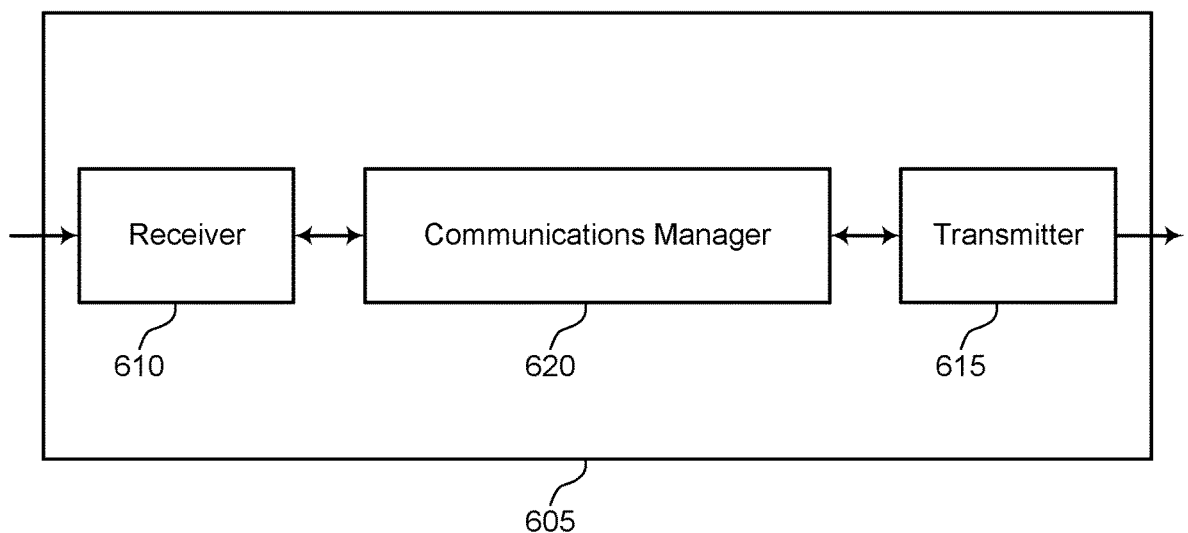
FIGS. 6 and 7 show block diagrams of devices that support scaling and quantization for CSI reporting in accordance with aspects of the present disclosure.

FIG. 6 shows a block diagram of a device 605 that supports scaling and quantization for CSI reporting in accordance with aspects of the present disclosure. The device 605 may be an example of aspects of an STA as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to scaling and quantization for CSI reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to scaling and quantization for CSI reporting). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of scaling and quantization for CSI reporting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 620, the receiver 610, the transmitter 615, or various combinations or components thereof may be implemented in code (for example, as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 620 may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at an STA in accordance with examples as disclosed herein. For example, the communications manager 620 may be configured as or otherwise support a means for receiving a null data packet on a set of multiple subcarriers of a channel. The communications manager 620 may be configured as or otherwise support a means for generating a channel state information matrix for each subcarrier of the set of multiple subcarriers of the channel. The communications manager 620 may be configured as or otherwise support a means for scaling each value in the channel state information matrix using a power-of-two value based on a determined value in the channel state information matrix. The communications manager 620 may be configured as or otherwise support a means for transmitting, to a second device, a channel state information report that includes the scaled values of the channel state information matrix.

Additionally, or alternatively, the communications manager 620 may support wireless communication in accordance with examples as disclosed herein. For example, the communications manager 620 may be configured as or otherwise support a means for receiving, in a channel state information report, a first channel state information matrix for each subcarrier of a set of multiple subcarriers of a channel. The communications manager 620 may be configured as or otherwise support a means for converting the first channel state information matrix to a second channel state information matrix based on a power-of-two value scaling each value in the first channel state information matrix. The communications manager 620 may be configured as or otherwise support a means for performing radio frequency sensing based on the second channel state information matrix.

Additionally, or alternatively, the communications manager 620 may support wireless communication at an STA in accordance with examples as disclosed herein. For example, the communications manager 620 may be configured as or otherwise support a means for receiving a null data packet at one or more receive antennas at the STA. The communications manager 620 may be configured as or otherwise support a means for measuring a signal strength of the null data packet received at each receive antenna of the one or more receive antennas. The communications manager 620 may be configured as or otherwise support a means for transmitting, to a second device, a channel state information report including a received signal strength indicator for each receive antenna of the one or more receive antennas, the received signal strength indicator indicating the measured signal strength of the null data packet at a respective receive antenna.

Additionally, or alternatively, the communications manager 620 may support wireless communication in accordance with examples as disclosed herein. For example, the communications manager 620 may be configured as or otherwise support a means for receiving a channel state information report including a received signal strength indicator indicating a received signal strength of a null data packet for each receive antenna of one or more receive antennas at an STA. The communications manager 620 may be configured as or otherwise support a means for performing radio frequency sensing based on the received signal strength indicator in the channel state information report.

Additionally, or alternatively, the communications manager 620 may support wireless communication at an STA in accordance with examples as disclosed herein. For example, the communications manager 620 may be configured as or otherwise support a means for receiving a null data packet at one or more receive antennas at the STA. The communications manager 620 may be configured as or otherwise support a means for measuring a total gain of one or more circuits at each receive antenna of the one or more receive antennas. The communications manager 620 may be configured as or otherwise support a means for transmitting, to a second device, a channel state information report including the total gain at each receive antenna of the one or more receive antennas.

Additionally, or alternatively, the communications manager 620 may support wireless communication in accordance with examples as disclosed herein. For example, the communications manager 620 may be configured as or otherwise support a means for receiving a channel state information report including a total gain of one or more circuits at each receive antenna of one or more receive antennas at an STA, the total gain measured based on a null data packet. The communications manager 620 may be configured as or otherwise support a means for performing radio frequency sensing based on the total gain at each receive antenna in the channel state information report.

By including or configuring the communications manager 620 in accordance with examples as described herein, the device 605 (for example, a processor controlling or otherwise coupled to the receiver 610, the transmitter 615, the communications manager 620, or a combination thereof) may support techniques for reduced processing and reduced power consumption. In particular, because a STA may perform scaling and quantization of a CSI matrix using a power-of-two value, the STA may avoid complex calculations when constructing a CSI report, resulting in the reduced processing and the reduced power consumption.

Figure 7:
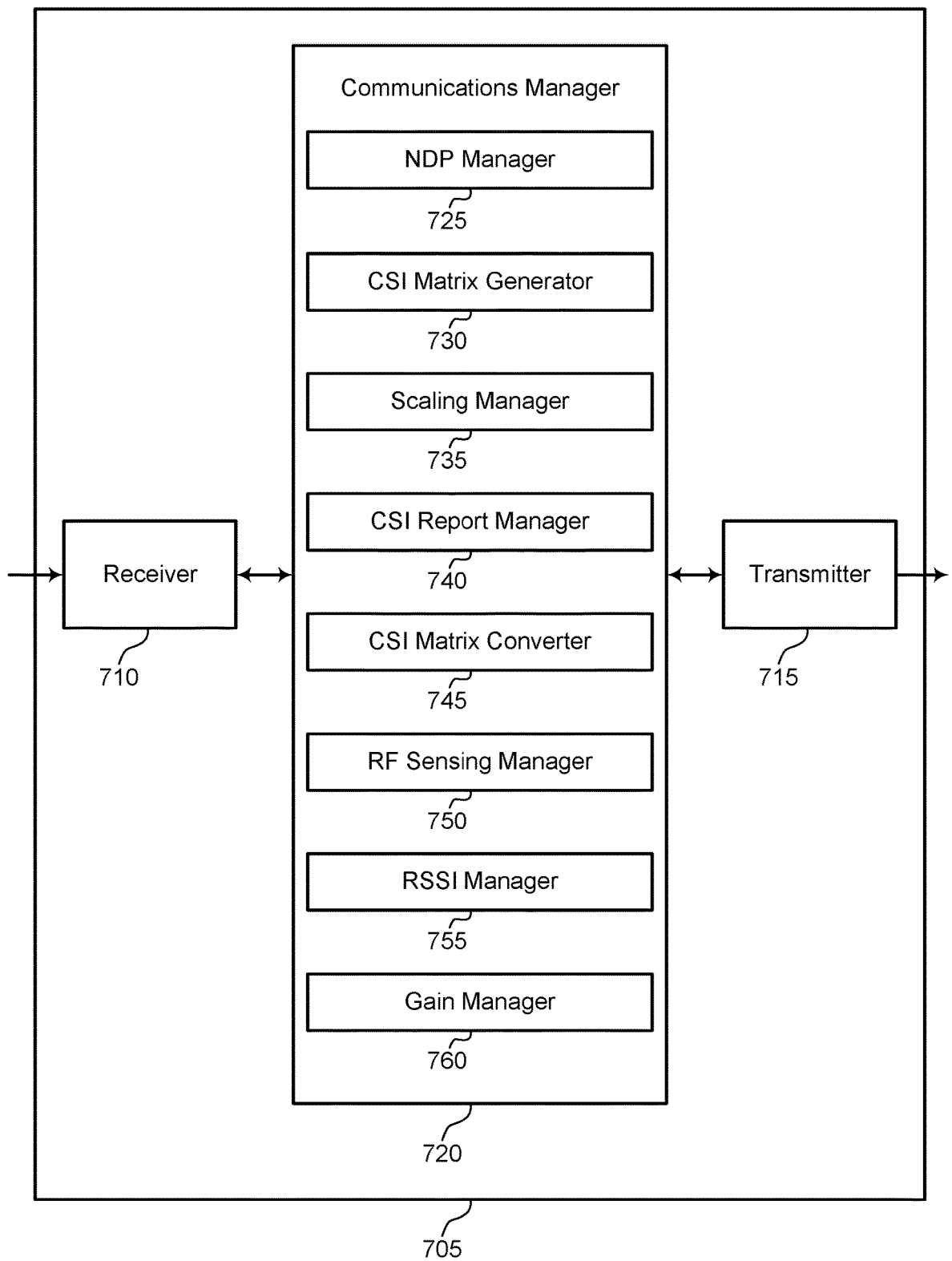

FIG. 7 shows a block diagram of a device 705 that supports scaling and quantization for CSI reporting in accordance with aspects of the present disclosure. The device 705 may be an example of aspects of a device 605 or an STA 115 as described herein. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to scaling and quantization for CSI reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to scaling and quantization for CSI reporting). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of scaling and quantization for CSI reporting as described herein. For example, the communications manager 720 may include an NDP manager 725, a CSI matrix generator 730, a scaling manager 735, a CSI report manager 740, a CSI matrix converter 745, an RF sensing manager 750, an RSSI manager 755, a gain manager 760, or any combination thereof. The communications manager 720 may be an example of aspects of a communications manager 620 as described herein. In some examples, the communications manager 720, or various components thereof, may be configured to perform various operations (for example, receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at an STA in accordance with examples as disclosed herein. The NDP manager 725 may be configured as or otherwise support a means for receiving a null data packet on a set of multiple subcarriers of a channel. The CSI matrix generator 730 may be configured as or otherwise support a means for generating a channel state information matrix for each subcarrier of the set of multiple subcarriers of the channel. The scaling manager 735 may be configured as or otherwise support a means for scaling each value in the channel state information matrix using a power-of-two value based on a determined value in the channel state information matrix. The CSI report manager 740 may be configured as or otherwise support a means for transmitting, to a second device, a channel state information report that includes the scaled values of the channel state information matrix.

Additionally, or alternatively, the communications manager 720 may support wireless communication in accordance with examples as disclosed herein. The CSI report manager 740 may be configured as or otherwise support a means for receiving, in a channel state information report, a first channel state information matrix for each subcarrier of a set of multiple subcarriers of a channel. The CSI matrix converter 745 may be configured as or otherwise support a means for converting the first channel state information matrix to a second channel state information matrix based on a power-of-two value scaling each value in the first channel state information matrix. The RF sensing manager 750 may be configured as or otherwise support a means for performing radio frequency sensing based on the second channel state information matrix.

Additionally, or alternatively, the communications manager 720 may support wireless communication at an STA in accordance with examples as disclosed herein. The NDP manager 725 may be configured as or otherwise support a means for receiving a null data packet at one or more receive antennas at the STA. The RSSI manager 755 may be configured as or otherwise support a means for measuring a signal strength of the null data packet received at each receive antenna of the one or more receive antennas. The RSSI manager 755 may be configured as or otherwise support a means for transmitting, to a second device, a channel state information report including a received signal strength indicator for each receive antenna of the one or more receive antennas, the received signal strength indicator indicating the measured signal strength of the null data packet at a respective receive antenna.

Additionally, or alternatively, the communications manager 720 may support wireless communication in accordance with examples as disclosed herein. The RSSI manager 755 may be configured as or otherwise support a means for receiving a channel state information report including a received signal strength indicator indicating a received signal strength of a null data packet for each receive antenna of one or more receive antennas at an STA. The RF sensing manager 750 may be configured as or otherwise support a means for performing radio frequency sensing based on the received signal strength indicator in the channel state information report.

Additionally, or alternatively, the communications manager 720 may support wireless communication at an STA in accordance with examples as disclosed herein. The NDP manager 725 may be configured as or otherwise support a means for receiving a null data packet at one or more receive antennas at the STA. The gain manager 760 may be configured as or otherwise support a means for measuring a total gain of one or more circuits at each receive antenna of the one or more receive antennas. The gain manager 760 may be configured as or otherwise support a means for transmitting, to a second device, a channel state information report including the total gain at each receive antenna of the one or more receive antennas.

Additionally, or alternatively, the communications manager 720 may support wireless communication in accordance with examples as disclosed herein. The gain manager 760 may be configured as or otherwise support a means for receiving a channel state information report including a total gain of one or more circuits at each receive antenna of one or more receive antennas at an STA, the total gain measured based on a null data packet. The RF sensing manager 750 may be configured as or otherwise support a means for performing radio frequency sensing based on the total gain at each receive antenna in the channel state information report.

Figure 8:
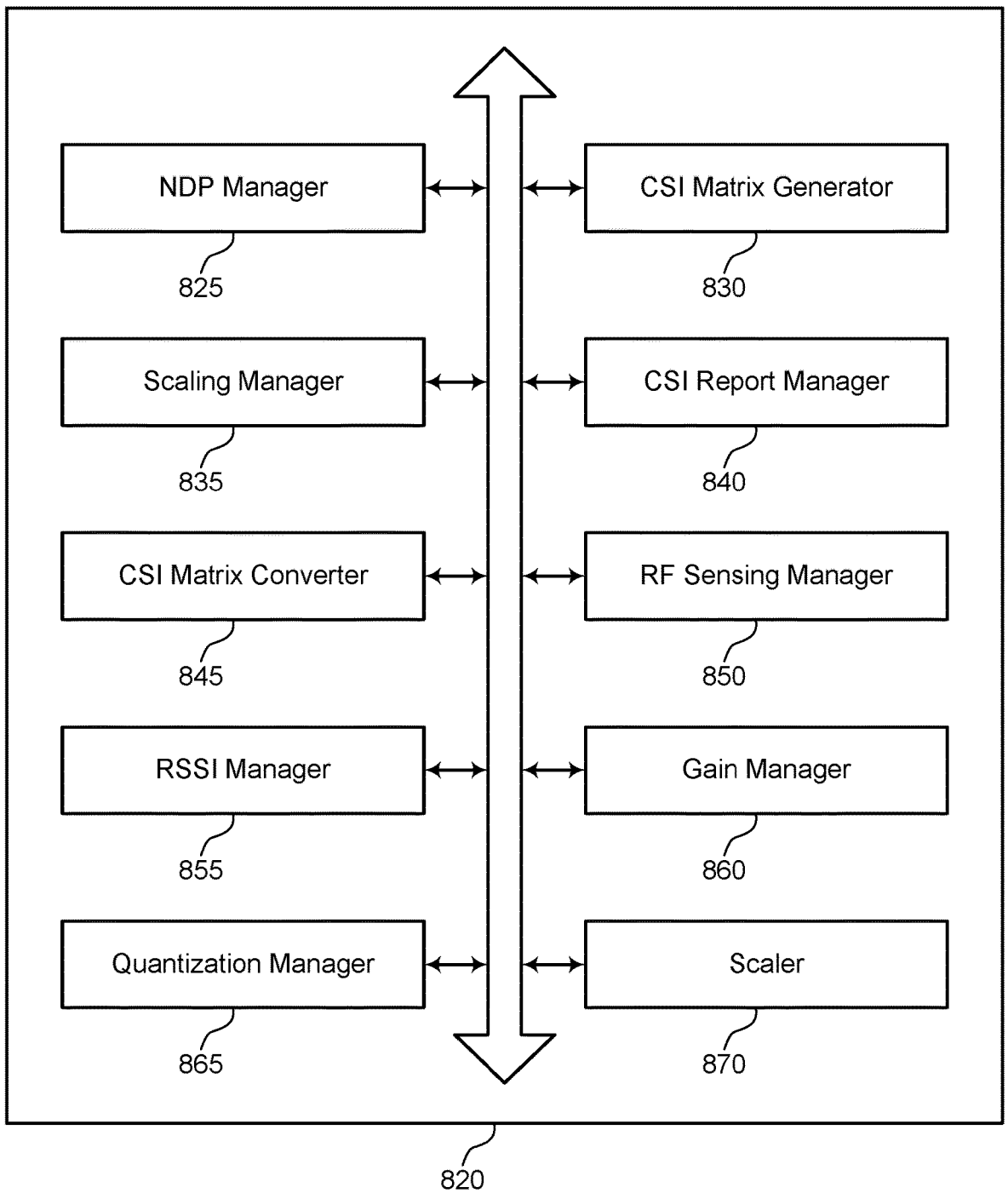
FIG. 8 shows a block diagram of a communications manager that supports scaling and quantization for CSI reporting in accordance with aspects of the present disclosure.

FIG. 8 shows a block diagram of a communications manager 820 that supports scaling and quantization for CSI reporting in accordance with aspects of the present disclosure. The communications manager 820 may be an example of aspects of a communications manager 620, a communications manager 720, or both, as described herein. The communications manager 820, or various components thereof, may be an example of means for performing various aspects of scaling and quantization for CSI reporting as described herein. For example, the communications manager 820 may include an NDP manager 825, a CSI matrix generator 830, a scaling manager 835, a CSI report manager 840, a CSI matrix converter 845, an RF sensing manager 850, an RSSI manager 855, a gain manager 860, a quantization manager 865, a scaler 870, or any combination thereof. Each of these components may communicate, directly or indirectly, with one another (for example, via one or more buses).

The communications manager 820 may support wireless communication at an STA in accordance with examples as disclosed herein. The NDP manager 825 may be configured as or otherwise support a means for receiving a null data packet on a set of multiple subcarriers of a channel. The CSI matrix generator 830 may be configured as or otherwise support a means for generating a channel state information matrix for each subcarrier of the set of multiple subcarriers of the channel. The scaling manager 835 may be configured as or otherwise support a means for scaling each value in the channel state information matrix using a power-of-two value based on a determined value in the channel state information matrix. The CSI report manager 840 may be configured as or otherwise support a means for transmitting, to a second device, a channel state information report that includes the scaled values of the channel state information matrix.

In some examples, to support scaling each value in the channel state information matrix using the power-of-two value, the scaling manager 835 may be configured as or otherwise support a means for scaling each value in the channel state information matrix using the power-of-two value such that a real and an imaginary part of each scaled value of the channel state information matrix is less than a largest positive value of a binary word having a word size configured for the channel state information matrix and greater than half of the largest positive value of the binary word.

In some examples, the quantization manager 865 may be configured as or otherwise support a means for quantizing a real and an imaginary part of each value in the channel state information matrix based on a word size configured for a format of the channel state information report, where transmitting the channel state information report includes. In some examples, the CSI report manager 840 may be configured as or otherwise support a means for transmitting the channel state information report that includes the quantized real and imaginary part of each value in the channel state information matrix.

In some examples, the quantization manager 865 may be configured as or otherwise support a means for receiving an indication of the word size configured for the format of the channel state information report, where quantizing the real and the imaginary part of each value in the channel state information matrix is based on receiving the indication of the word size.

In some examples, the CSI matrix converter 845 may be configured as or otherwise support a means for transmitting, to the second device, an indication of a value for the second device to use to convert the transmitted channel state information matrix to the generated channel state information matrix.

In some examples, the value for the second device to use to convert the transmitted channel state information matrix to the generated channel state information matrix is based on a word size configured for the channel state information matrix, a word size configured for a format of the channel state information report, and the power-of-two value used to scale each value in the channel state information matrix. In some examples, the second device includes another STA or an access point.

In some examples, to support scaling each value in the channel state information matrix using the power-of-two value, the scaler 870 may be configured as or otherwise support a means for shifting a real and an imaginary part of each value in the channel state information matrix by the power-of-two value.

In some examples, each value in the channel state information matrix includes a real part and an imaginary part, and the determined value in the channel state information matrix includes a maximum value of real parts or imaginary parts of values in the channel state information matrix.

Additionally, or alternatively, the communications manager 820 may support wireless communication in accordance with examples as disclosed herein. In some examples, the CSI report manager 840 may be configured as or otherwise support a means for receiving, in a channel state information report, a first channel state information matrix for each subcarrier of a set of multiple subcarriers of a channel. The CSI matrix converter 845 may be configured as or otherwise support a means for converting the first channel state information matrix to a second channel state information matrix based on a power-of-two value scaling each value in the first channel state information matrix. The RF sensing manager 850 may be configured as or otherwise support a means for performing radio frequency sensing based on the second channel state information matrix.

In some examples, the quantization manager 865 may be configured as or otherwise support a means for transmitting an indication of a word size configured for a format of the channel state information report, where each value in the first channel state information matrix is quantized based on the word size configured for the format of the channel state information report.

In some examples, the CSI matrix converter 845 may be configured as or otherwise support a means for receiving an indication of a value for converting the first channel state information matrix to the second channel state information matrix, where the converting is based on receiving the value for converting.

In some examples, the value for converting the first channel state information matrix to the second channel state information matrix includes an exponent of two that is based on a word size configured for the second channel state information matrix, a word size configured for a format of the channel state information report, and the power-of-two value used to scale each value in the first channel state information matrix.

In some examples, each value in the first channel state information matrix and the second channel state information matrix includes an in-phase value and a quadrature value.

Additionally, or alternatively, the communications manager 820 may support wireless communication at an STA in accordance with examples as disclosed herein. In some examples, the NDP manager 825 may be configured as or otherwise support a means for receiving a null data packet at one or more receive antennas at the STA. The RSSI manager 855 may be configured as or otherwise support a means for measuring a signal strength of the null data packet received at each receive antenna of the one or more receive antennas. In some examples, the RSSI manager 855 may be configured as or otherwise support a means for transmitting, to a second device, a channel state information report including a received signal strength indicator for each receive antenna of the one or more receive antennas, the received signal strength indicator indicating the measured signal strength of the null data packet at a respective receive antenna.

In some examples, the RSSI manager 855 may be configured as or otherwise support a means for receiving a request to transmit the received signal strength indicator in the channel state information report, where transmitting the channel state information report including the received signal strength indicator is based on receiving the request.

In some examples, the gain manager 860 may be configured as or otherwise support a means for measuring a total gain of one or more circuits at each receive antenna of the one or more receive antennas, the method further including. In some examples, the gain manager 860 may be configured as or otherwise support a means for transmitting the total gain at each receive antenna in the channel state information report.

In some examples, the gain manager 860 may be configured as or otherwise support a means for receiving a request to transmit the total gain at each receive antenna in the channel state information report, where transmitting the total gain at each receive antenna in the channel state information report is based on receiving the request.

Additionally, or alternatively, the communications manager 820 may support wireless communication in accordance with examples as disclosed herein. In some examples, the RSSI manager 855 may be configured as or otherwise support a means for receiving a channel state information report including a received signal strength indicator indicating a received signal strength of a null data packet for each receive antenna of one or more receive antennas at an STA. In some examples, the RF sensing manager 850 may be configured as or otherwise support a means for performing radio frequency sensing based on the received signal strength indicator in the channel state information report.

In some examples, the RSSI manager 855 may be configured as or otherwise support a means for transmitting a request for the STA to include the received signal strength indicator in the channel state information report, where receiving the channel state information report including the received signal strength indicator is based on transmitting the request.

In some examples, the gain manager 860 may be configured as or otherwise support a means for receiving, in the channel state information report, a total gain of one or more circuits at each receive antenna of the one or more receive antennas at the STA.

In some examples, the gain manager 860 may be configured as or otherwise support a means for transmitting a request for the STA to include the total gain at each receive antenna in the channel state information report, where receiving the total gain at each receive antenna in the channel state information report is based on transmitting the request.

Additionally, or alternatively, the communications manager 820 may support wireless communication at an STA in accordance with examples as disclosed herein. In some examples, the NDP manager 825 may be configured as or otherwise support a means for receiving a null data packet at one or more receive antennas at the STA. The gain manager 860 may be configured as or otherwise support a means for measuring a total gain of one or more circuits at each receive antenna of the one or more receive antennas. In some examples, the gain manager 860 may be configured as or otherwise support a means for transmitting, to a second device, a channel state information report including the total gain at each receive antenna of the one or more receive antennas.

In some examples, the gain manager 860 may be configured as or otherwise support a means for receiving a request to transmit the total gain at each receive antenna in the channel state information report, where transmitting the total gain at each receive antenna in the channel state information report is based on receiving the request.

In some examples, the RSSI manager 855 may be configured as or otherwise support a means for measuring a received signal strength of the null data packet received at each receive antenna of the one or more receive antennas, the method further including. In some examples, the RSSI manager 855 may be configured as or otherwise support a means for transmitting a received signal strength indicator in the channel state information report indicating the received signal strength of the null data packet received at each receive antenna of the one or more receive antennas.

In some examples, the RSSI manager 855 may be configured as or otherwise support a means for receiving a request to transmit the received signal strength indicator in the channel state information report, where transmitting the received signal strength indicator in the channel state information report is based on receiving the request.

Additionally, or alternatively, the communications manager 820 may support wireless communication in accordance with examples as disclosed herein. In some examples, the gain manager 860 may be configured as or otherwise support a means for receiving a channel state information report including a total gain of one or more circuits at each receive antenna of one or more receive antennas at an STA, the total gain measured based on a null data packet. In some examples, the RF sensing manager 850 may be configured as or otherwise support a means for performing radio frequency sensing based on the total gain at each receive antenna in the channel state information report.

In some examples, the gain manager 860 may be configured as or otherwise support a means for transmitting a request for the STA to include the total gain at each receive antenna in the channel state information report, where receiving the channel state information report including the total gain is based on transmitting the request.

In some examples, to support receiving the channel state information report, the RSSI manager 855 may be configured as or otherwise support a means for receiving, in the channel state information report, a received signal strength indicator indicating a received signal strength of the null data packet at each receive antenna of the one or more receive antennas at the STA.

In some examples, the RSSI manager 855 may be configured as or otherwise support a means for transmitting a request for the STA to include the received signal strength indicator in the channel state information report, where receiving the received signal strength indicator in the channel state information report is based on transmitting the request.

Figure 9:
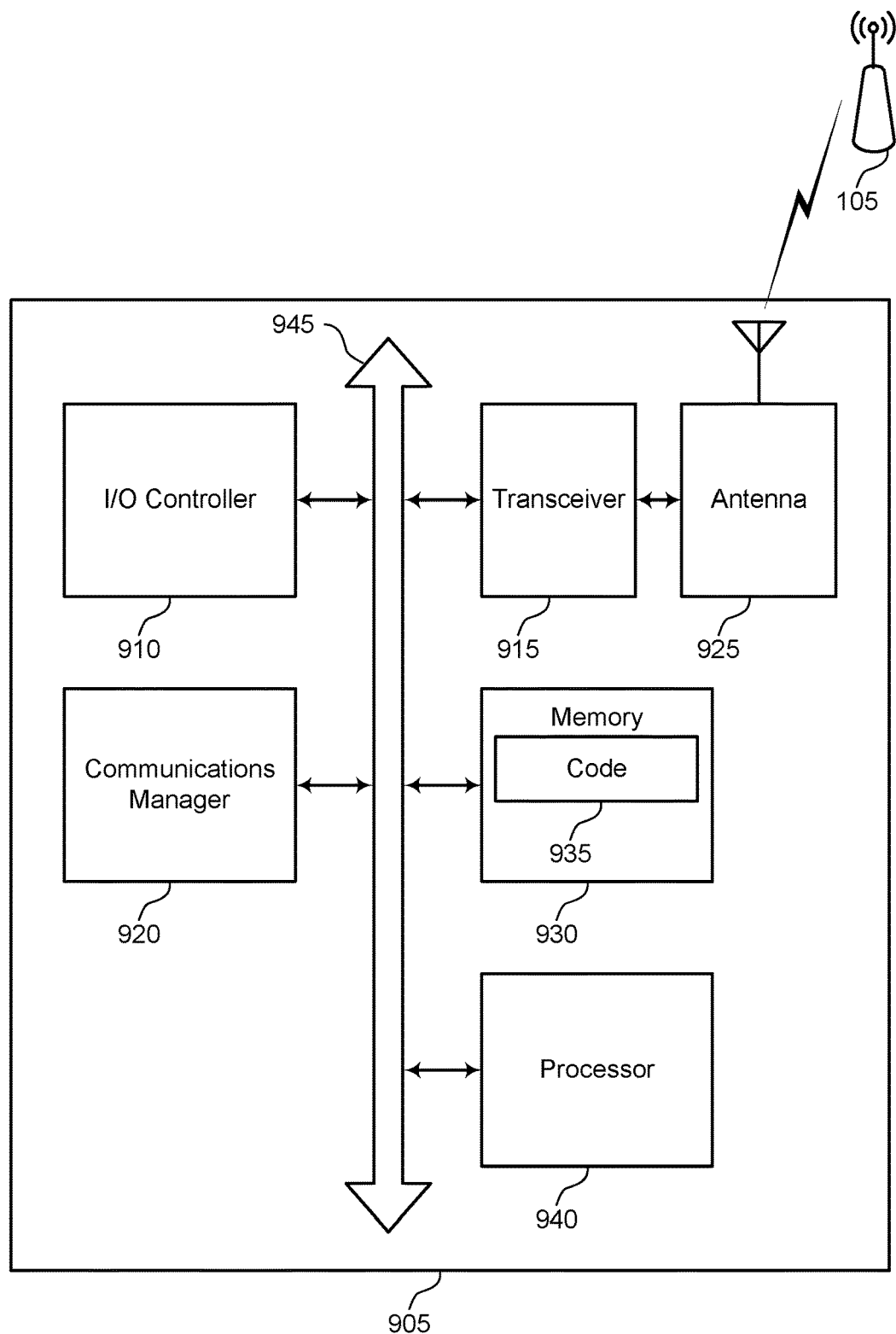
FIG. 9 shows a diagram of a system including a device that supports scaling and quantization for CSI reporting in accordance with aspects of the present disclosure.

FIG. 9 shows a diagram of a system 900 including a device 905 that supports scaling and quantization for CSI reporting in accordance with aspects of the present disclosure. The device 905 may be an example of or include the components of a device 605, a device 705, or an STA as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some examples, the I/O controller 910 may represent a physical connection or port to an external peripheral. In some examples, the I/O controller 910 may utilize an operating system such as iOS®, ANDROID®, MS-DOS®, MS-WINDOWS®, OS/2®, UNIX®, LINUX®, or another known operating system. In some other examples, the I/O controller 910 may represent or interact with a modem, a keyboard, a mouse, a touchscreen, or a similar device. In some examples, the I/O controller 910 may be implemented as part of a processor, such as the processor 940. In some examples, a user may interact with the device 905 via the I/O controller 910 or via hardware components controlled by the I/O controller 910.

In some examples, the device 905 may include a single antenna 925. However, in some other examples the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets and provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. In some examples, the memory 930 may contain, among other things, a BIOS which may control basic hardware or software operation such as the interaction with peripheral components or devices.

The processor 940 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In some other examples, a memory controller may be integrated into the processor 940. The processor 940 may be configured to execute computer-readable instructions stored in a memory (for example, the memory 930) to cause the device 905 to perform various functions (for example, functions or tasks supporting scaling and quantization for CSI reporting). For example, the device 905 or a component of the device 905 may include a processor 940 and memory 930 coupled to the processor 940, the processor 940 and memory 930 configured to perform various functions described herein.

The communications manager 920 may support wireless communication at an STA in accordance with examples as disclosed herein. For example, the communications manager 920 may be configured as or otherwise support a means for receiving a null data packet on a set of multiple subcarriers of a channel. The communications manager 920 may be configured as or otherwise support a means for generating a channel state information matrix for each subcarrier of the set of multiple subcarriers of the channel. The communications manager 920 may be configured as or otherwise support a means for scaling each value in the channel state information matrix using a power-of-two value based on a determined value in the channel state information matrix. The communications manager 920 may be configured as or otherwise support a means for transmitting, to a second device, a channel state information report that includes the scaled values of the channel state information matrix.

Additionally, or alternatively, the communications manager 920 may support wireless communication in accordance with examples as disclosed herein. For example, the communications manager 920 may be configured as or otherwise support a means for receiving, in a channel state information report, a first channel state information matrix for each subcarrier of a set of multiple subcarriers of a channel. The communications manager 920 may be configured as or otherwise support a means for converting the first channel state information matrix to a second channel state information matrix based on a power-of-two value scaling each value in the first channel state information matrix. The communications manager 920 may be configured as or otherwise support a means for performing radio frequency sensing based on the second channel state information matrix.

Additionally, or alternatively, the communications manager 920 may support wireless communication at an STA in accordance with examples as disclosed herein. For example, the communications manager 920 may be configured as or otherwise support a means for receiving a null data packet at one or more receive antennas at the STA. The communications manager 920 may be configured as or otherwise support a means for measuring a signal strength of the null data packet received at each receive antenna of the one or more receive antennas. The communications manager 920 may be configured as or otherwise support a means for transmitting, to a second device, a channel state information report including a received signal strength indicator for each receive antenna of the one or more receive antennas, the received signal strength indicator indicating the measured signal strength of the null data packet at a respective receive antenna.

Additionally, or alternatively, the communications manager 920 may support wireless communication in accordance with examples as disclosed herein. For example, the communications manager 920 may be configured as or otherwise support a means for receiving a channel state information report including a received signal strength indicator indicating a received signal strength of a null data packet for each receive antenna of one or more receive antennas at an STA. The communications manager 920 may be configured as or otherwise support a means for performing radio frequency sensing based on the received signal strength indicator in the channel state information report.

Additionally, or alternatively, the communications manager 920 may support wireless communication at an STA in accordance with examples as disclosed herein. For example, the communications manager 920 may be configured as or otherwise support a means for receiving a null data packet at one or more receive antennas at the STA. The communications manager 920 may be configured as or otherwise support a means for measuring a total gain of one or more circuits at each receive antenna of the one or more receive antennas. The communications manager 920 may be configured as or otherwise support a means for transmitting, to a second device, a channel state information report including the total gain at each receive antenna of the one or more receive antennas.

Additionally, or alternatively, the communications manager 920 may support wireless communication in accordance with examples as disclosed herein. For example, the communications manager 920 may be configured as or otherwise support a means for receiving a channel state information report including a total gain of one or more circuits at each receive antenna of one or more receive antennas at an STA, the total gain measured based on a null data packet. The communications manager 920 may be configured as or otherwise support a means for performing radio frequency sensing based on the total gain at each receive antenna in the channel state information report.

By including or configuring the communications manager 920 in accordance with examples as described herein, the device 905 may support techniques for reduced processing and reduced power consumption. In particular, because a STA may perform scaling and quantization of a CSI matrix using a power-of-two value, the STA may avoid complex calculations when constructing a CSI report, resulting in the reduced processing and the reduced power consumption.

Figure 10:
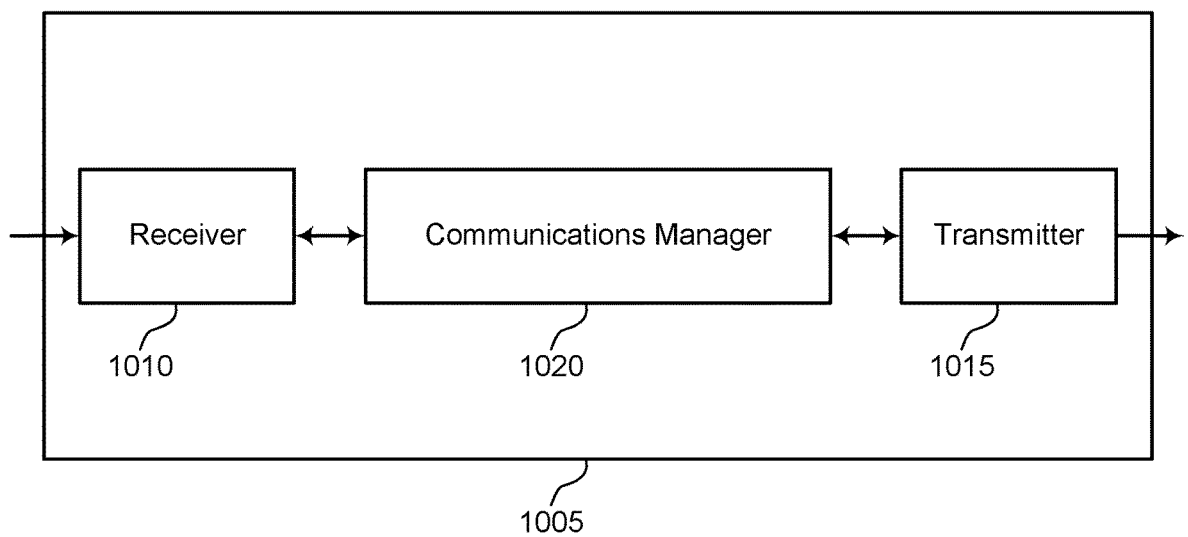
FIGS. 10 and 11 show block diagrams of devices that support scaling and quantization for CSI reporting in accordance with aspects of the present disclosure.

FIG. 10 shows a block diagram of a device 1005 that supports scaling and quantization for CSI reporting in accordance with aspects of the present disclosure. The device 1005 may be an example of aspects of an AP as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to scaling and quantization for CSI reporting). Information may be passed on to other components of the device 1005. The receiver 1010 may utilize a single antenna or a set of multiple antennas.

The transmitter 1015 may provide a means for transmitting signals generated by other components of the device 1005. The transmitter 1015 may utilize a single antenna or a set of multiple antennas.

The communications manager 1020, the receiver 1010, the transmitter 1015, or various combinations thereof or various components thereof may be examples of means for performing various aspects of scaling and quantization for CSI reporting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 1020, the receiver 1010, the transmitter 1015, or various combinations or components thereof may be implemented in code (for example, as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 1020 may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication in accordance with examples as disclosed herein. For example, the communications manager 1020 may be configured as or otherwise support a means for receiving, in a channel state information report, a first channel state information matrix for each subcarrier of a set of multiple subcarriers of a channel. The communications manager 1020 may be configured as or otherwise support a means for converting the first channel state information matrix to a second channel state information matrix based on a power-of-two value scaling each value in the first channel state information matrix. The communications manager 1020 may be configured as or otherwise support a means for performing radio frequency sensing based on the second channel state information matrix.

Additionally, or alternatively, the communications manager 1020 may support wireless communication in accordance with examples as disclosed herein. For example, the communications manager 1020 may be configured as or otherwise support a means for receiving a channel state information report including a received signal strength indicator indicating a received signal strength of a null data packet for each receive antenna of one or more receive antennas at an STA. The communications manager 1020 may be configured as or otherwise support a means for performing radio frequency sensing based on the received signal strength indicator in the channel state information report.

Additionally, or alternatively, the communications manager 1020 may support wireless communication in accordance with examples as disclosed herein. For example, the communications manager 1020 may be configured as or otherwise support a means for receiving a channel state information report including a total gain of one or more circuits at each receive antenna of one or more receive antennas at an STA, the total gain measured based on a null data packet. The communications manager 1020 may be configured as or otherwise support a means for performing radio frequency sensing based on the total gain at each receive antenna in the channel state information report.

By including or configuring the communications manager 1020 in accordance with examples as described herein, the device 1005 (for example, a processor controlling or otherwise coupled to the receiver 1010, the transmitter 1015, the communications manager 1020, or a combination thereof) may support techniques for reduced processing and reduced power consumption. In particular, because a STA or AP may convert a received CSI matrix to an original CSI matrix using a power-of-two value, the STA or AP may avoid complex computations when converting to the original CSI matrix, resulting in the reduced processing and the reduced power consumption.

Figure 11:
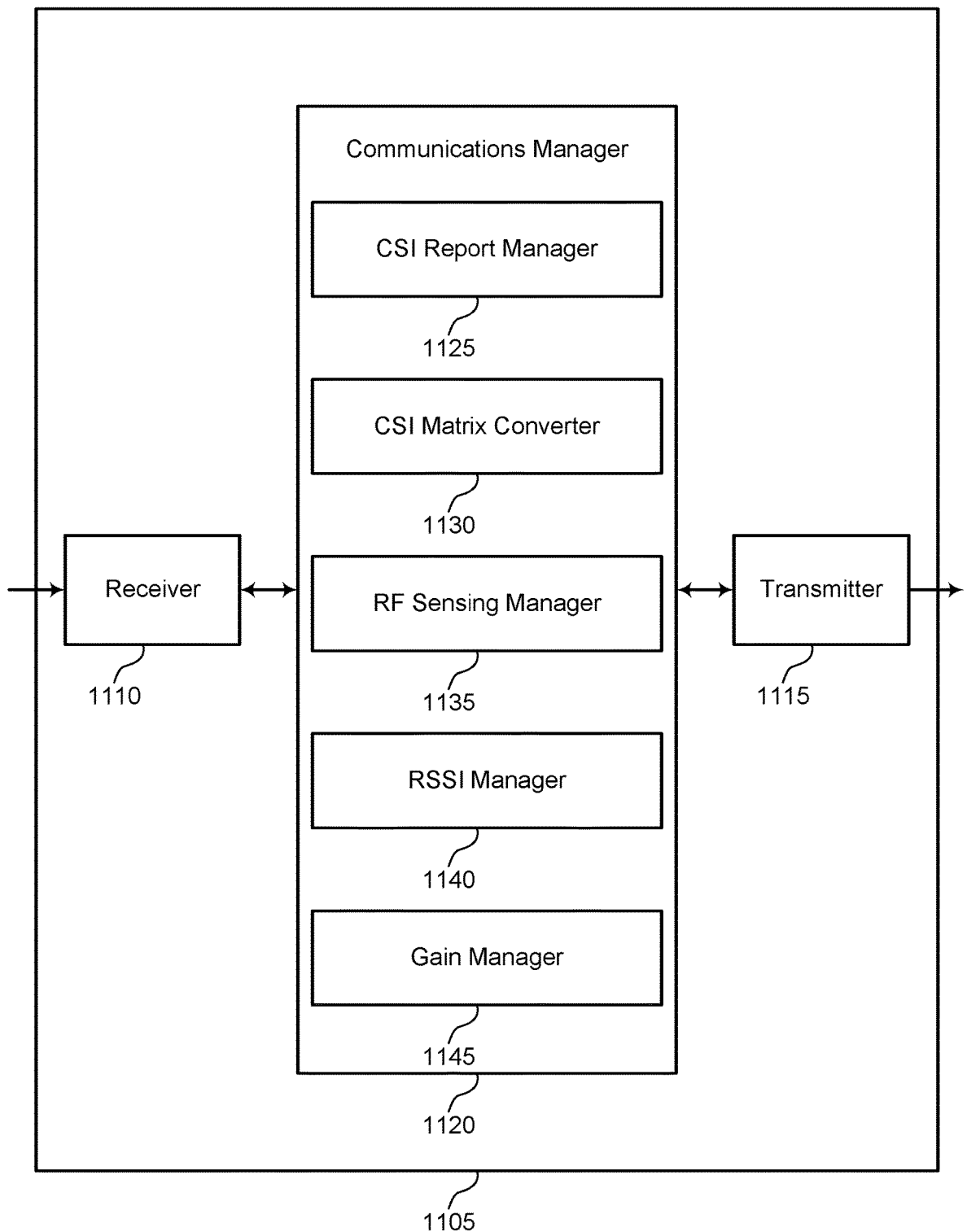

FIG. 11 shows a block diagram of a device 1105 that supports scaling and quantization for CSI reporting in accordance with aspects of the present disclosure. The device 1105 may be an example of aspects of a device 1005 or an AP 115 as described herein. The device 1105 may include a receiver 1110, a transmitter 1115, and a communications manager 1120. The communications manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to scaling and quantization for CSI reporting). Information may be passed on to other components of the device 1105. The receiver 1110 may utilize a single antenna or a set of multiple antennas.

The transmitter 1115 may provide a means for transmitting signals generated by other components of the device 1105. The transmitter 1115 may utilize a single antenna or a set of multiple antennas.

The device 1105, or various components thereof, may be an example of means for performing various aspects of scaling and quantization for CSI reporting as described herein. For example, the communications manager 1120 may include a CSI report manager 1125, a CSI matrix converter 1130, an RF sensing manager 1135, an RSSI manager 1140, a gain manager 1145, or any combination thereof. The communications manager 1120 may be an example of aspects of a communications manager 1020 as described herein. In some examples, the communications manager 1120, or various components thereof, may be configured to perform various operations (for example, receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication in accordance with examples as disclosed herein. The CSI report manager 1125 may be configured as or otherwise support a means for receiving, in a channel state information report, a first channel state information matrix for each subcarrier of a set of multiple subcarriers of a channel. The CSI matrix converter 1130 may be configured as or otherwise support a means for converting the first channel state information matrix to a second channel state information matrix based on a power-of-two value scaling each value in the first channel state information matrix. The RF sensing manager 1135 may be configured as or otherwise support a means for performing radio frequency sensing based on the second channel state information matrix.

Additionally, or alternatively, the communications manager 1120 may support wireless communication in accordance with examples as disclosed herein. The RSSI manager 1140 may be configured as or otherwise support a means for receiving a channel state information report including a received signal strength indicator indicating a received signal strength of a null data packet for each receive antenna of one or more receive antennas at an STA. The RF sensing manager 1135 may be configured as or otherwise support a means for performing radio frequency sensing based on the received signal strength indicator in the channel state information report.

Additionally, or alternatively, the communications manager 1120 may support wireless communication in accordance with examples as disclosed herein. The gain manager 1145 may be configured as or otherwise support a means for receiving a channel state information report including a total gain of one or more circuits at each receive antenna of one or more receive antennas at an STA, the total gain measured based on a null data packet. The RF sensing manager 1135 may be configured as or otherwise support a means for performing radio frequency sensing based on the total gain at each receive antenna in the channel state information report.

Figure 12:
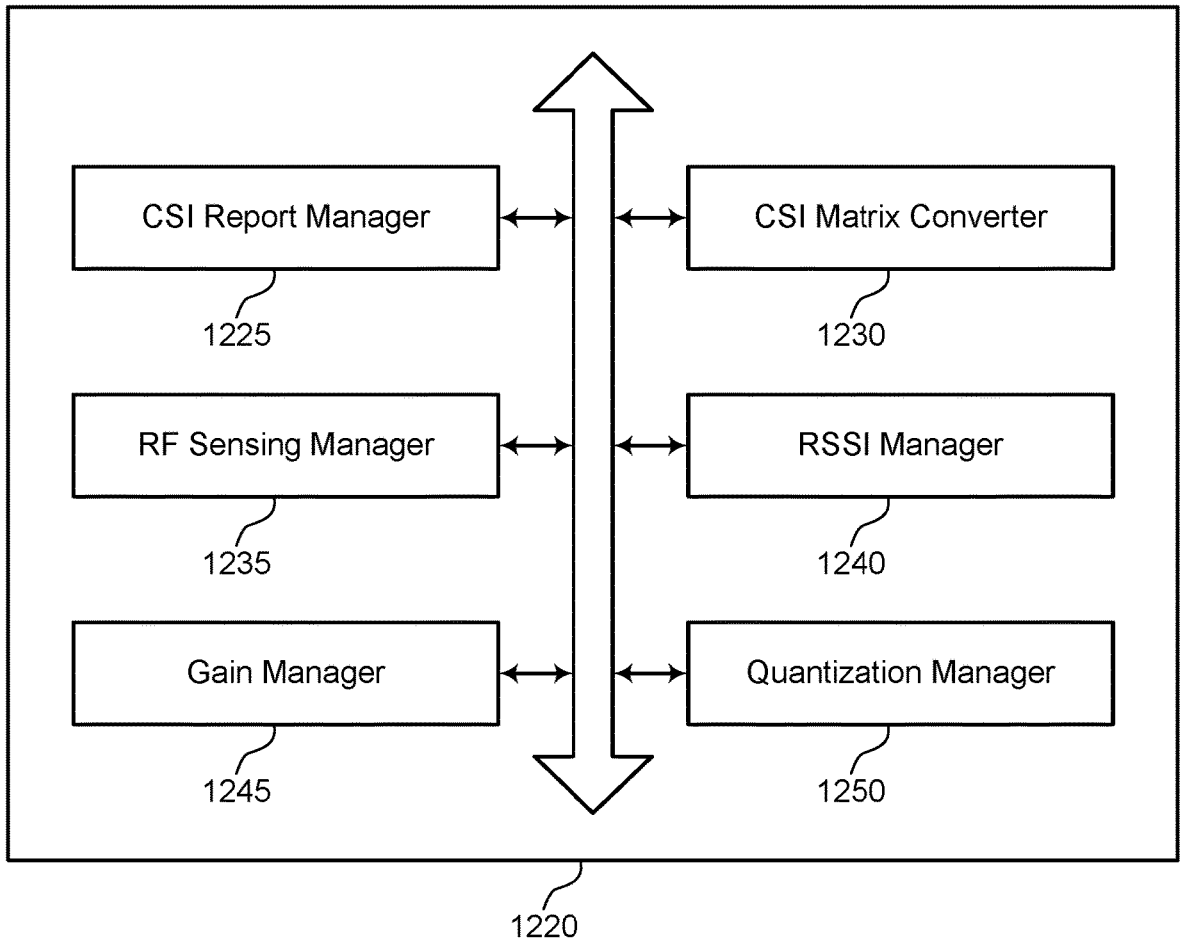
FIG. 12 shows a block diagram of a communications manager that supports scaling and quantization for CSI reporting in accordance with aspects of the present disclosure.

FIG. 12 shows a block diagram of a communications manager 1220 that supports scaling and quantization for CSI reporting in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of scaling and quantization for CSI reporting as described herein. For example, the communications manager 1220 may include a CSI report manager 1225, a CSI matrix converter 1230, an RF sensing manager 1235, an RSSI manager 1240, a gain manager 1245, a quantization manager 1250, or any combination thereof. Each of these components may communicate, directly or indirectly, with one another (for example, via one or more buses).

The communications manager 1220 may support wireless communication in accordance with examples as disclosed herein. The CSI report manager 1225 may be configured as or otherwise support a means for receiving, in a channel state information report, a first channel state information matrix for each subcarrier of a set of multiple subcarriers of a channel. The CSI matrix converter 1230 may be configured as or otherwise support a means for converting the first channel state information matrix to a second channel state information matrix based on a power-of-two value scaling each value in the first channel state information matrix. The RF sensing manager 1235 may be configured as or otherwise support a means for performing radio frequency sensing based on the second channel state information matrix.

In some examples, the quantization manager 1250 may be configured as or otherwise support a means for transmitting an indication of a word size configured for a format of the channel state information report, where each value in the first channel state information matrix is quantized based on the word size configured for the format of the channel state information report.

In some examples, the CSI matrix converter 1230 may be configured as or otherwise support a means for receiving an indication of a value for converting the first channel state information matrix to the second channel state information matrix, where the converting is based on receiving the value for converting.

In some examples, the value for converting the first channel state information matrix to the second channel state information matrix includes an exponent of two that is based on a word size configured for the second channel state information matrix, a word size configured for a format of the channel state information report, and the power-of-two value used to scale each value in the first channel state information matrix.

In some examples, each value in the first channel state information matrix and the second channel state information matrix includes an in-phase value and a quadrature value.

Additionally, or alternatively, the communications manager 1220 may support wireless communication in accordance with examples as disclosed herein. The RSSI manager 1240 may be configured as or otherwise support a means for receiving a channel state information report including a received signal strength indicator indicating a received signal strength of a null data packet for each receive antenna of one or more receive antennas at an STA. In some examples, the RF sensing manager 1235 may be configured as or otherwise support a means for performing radio frequency sensing based on the received signal strength indicator in the channel state information report.

In some examples, the RSSI manager 1240 may be configured as or otherwise support a means for transmitting a request for the STA to include the received signal strength indicator in the channel state information report, where receiving the channel state information report including the received signal strength indicator is based on transmitting the request.

In some examples, the gain manager 1245 may be configured as or otherwise support a means for receiving, in the channel state information report, a total gain of one or more circuits at each receive antenna of the one or more receive antennas at the STA.

In some examples, the gain manager 1245 may be configured as or otherwise support a means for transmitting a request for the STA to include the total gain at each receive antenna in the channel state information report, where receiving the total gain at each receive antenna in the channel state information report is based on transmitting the request.

Additionally, or alternatively, the communications manager 1220 may support wireless communication in accordance with examples as disclosed herein. The gain manager 1245 may be configured as or otherwise support a means for receiving a channel state information report including a total gain of one or more circuits at each receive antenna of one or more receive antennas at an STA, the total gain measured based on a null data packet. In some examples, the RF sensing manager 1235 may be configured as or otherwise support a means for performing radio frequency sensing based on the total gain at each receive antenna in the channel state information report.

In some examples, the gain manager 1245 may be configured as or otherwise support a means for transmitting a request for the STA to include the total gain at each receive antenna in the channel state information report, where receiving the channel state information report including the total gain is based on transmitting the request.

In some examples, to support receiving the channel state information report, the RSSI manager 1240 may be configured as or otherwise support a means for receiving, in the channel state information report, a received signal strength indicator indicating a received signal strength of the null data packet at each receive antenna of the one or more receive antennas at the STA.

In some examples, the RSSI manager 1240 may be configured as or otherwise support a means for transmitting a request for the STA to include the received signal strength indicator in the channel state information report, where receiving the received signal strength indicator in the channel state information report is based on transmitting the request.

Figure 13:
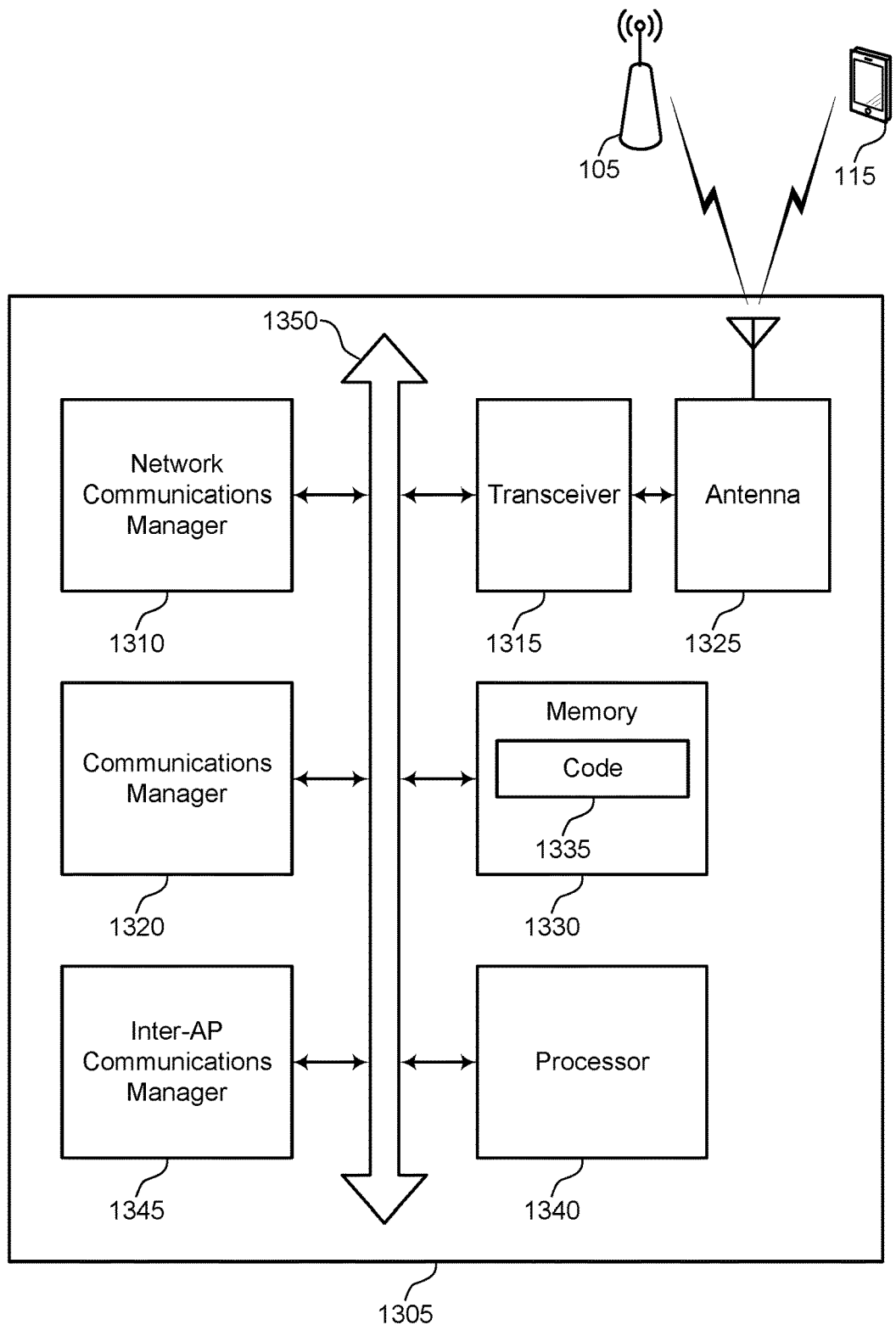
FIG. 13 shows a diagram of a system including a device that supports scaling and quantization for CSI reporting in accordance with aspects of the present disclosure.

FIG. 13 shows a diagram of a system 1300 including a device 1305 that supports scaling and quantization for CSI reporting in accordance with aspects of the present disclosure. The device 1305 may be an example of or include the components of a device 1005, a device 1105, or an AP as described herein. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-AP communications manager 1345. These components may be in electronic communication or otherwise coupled (for example, operatively, communicatively, functionally, electronically, electrically) via one or more buses (for example, a bus 1350).

The network communications manager 1310 may manage communications with a core network (for example, via one or more wired backhaul links). For example, the network communications manager 1310 may manage the transfer of data communications for client devices, such as one or more STAs 115.

In some examples, the device 1305 may include a single antenna 1325. However, in some other examples the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets and provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. In some examples, the memory 1330 may contain, among other things, a BIOS which may control basic hardware or software operation such as the interaction with peripheral components or devices.

The processor 1340 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some other examples, a memory controller may be integrated into the processor 1340. The processor 1340 may be configured to execute computer-readable instructions stored in a memory (for example, the memory 1330) to cause the device 1305 to perform various functions (for example, functions or tasks supporting scaling and quantization for CSI reporting). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other APs 105, and may include a controller or scheduler for controlling communications with STAs 115 in cooperation with other APs 105. For example, the inter-station communications manager 1345 may coordinate scheduling for transmissions to APs 105 for various interference mitigation techniques such as beamforming or joint transmission. In some examples, the inter-station communications manager 1345 may provide an X2 interface within an LTE/LTE-A wireless communication network technology to provide communication between APs 105.

The communications manager 1320 may support wireless communication in accordance with examples as disclosed herein. For example, the communications manager 1320 may be configured as or otherwise support a means for receiving, in a channel state information report, a first channel state information matrix for each subcarrier of a set of multiple subcarriers of a channel. The communications manager 1320 may be configured as or otherwise support a means for converting the first channel state information matrix to a second channel state information matrix based on a power-of-two value scaling each value in the first channel state information matrix. The communications manager 1320 may be configured as or otherwise support a means for performing radio frequency sensing based on the second channel state information matrix.

Additionally, or alternatively, the communications manager 1320 may support wireless communication in accordance with examples as disclosed herein. For example, the communications manager 1320 may be configured as or otherwise support a means for receiving a channel state information report including a received signal strength indicator indicating a received signal strength of a null data packet for each receive antenna of one or more receive antennas at an STA. The communications manager 1320 may be configured as or otherwise support a means for performing radio frequency sensing based on the received signal strength indicator in the channel state information report.

Additionally, or alternatively, the communications manager 1320 may support wireless communication in accordance with examples as disclosed herein. For example, the communications manager 1320 may be configured as or otherwise support a means for receiving a channel state information report including a total gain of one or more circuits at each receive antenna of one or more receive antennas at an STA, the total gain measured based on a null data packet. The communications manager 1320 may be configured as or otherwise support a means for performing radio frequency sensing based on the total gain at each receive antenna in the channel state information report.

By including or configuring the communications manager 1320 in accordance with examples as described herein, the device 1305 may support techniques for reduced processing and reduced power consumption. In particular, because a STA or AP may convert a received CSI matrix to an original CSI matrix using a power-of-two value, the STA or AP may avoid complex computations when converting to the original CSI matrix, resulting in the reduced processing and the reduced power consumption.

Figure 14:
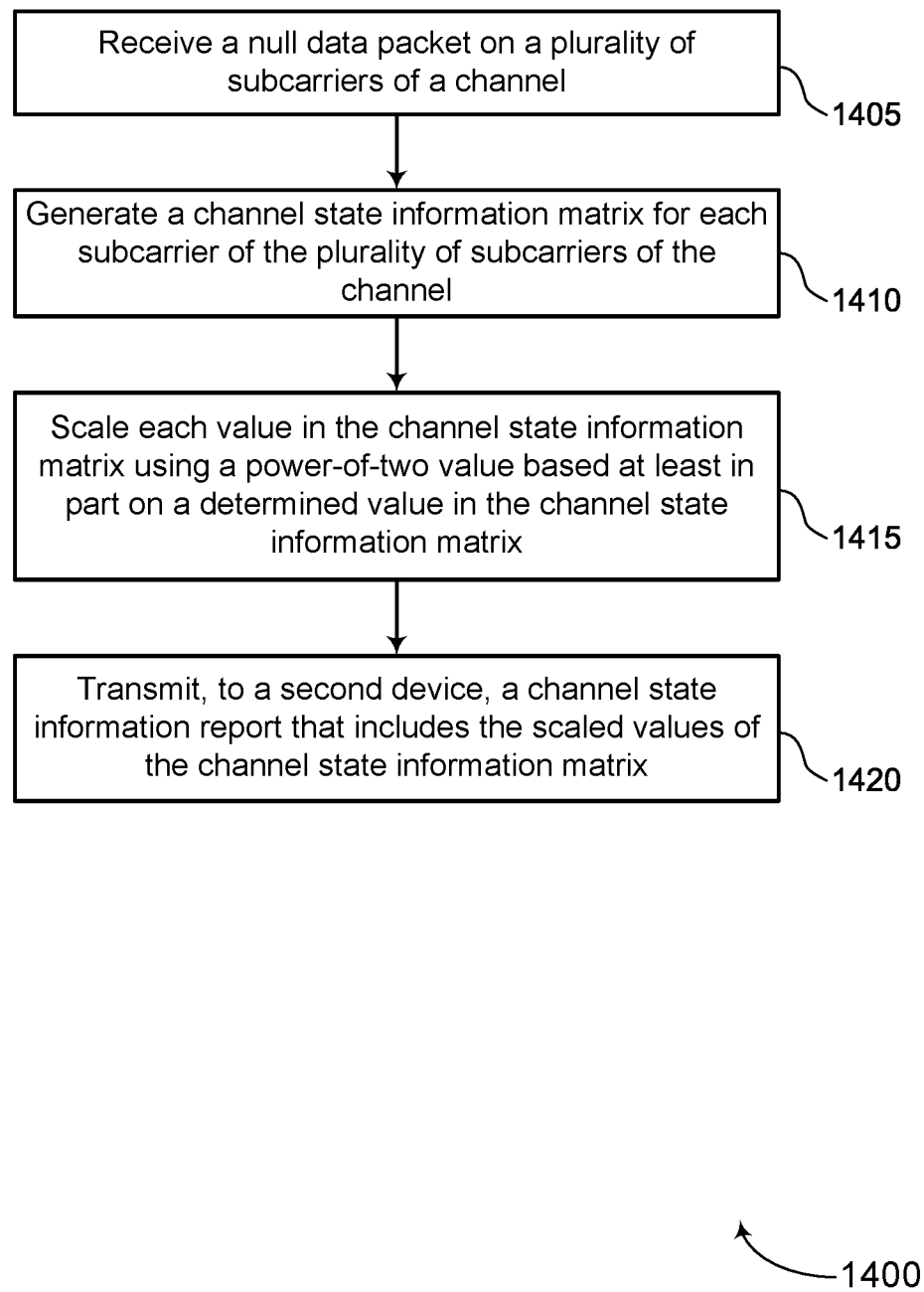
FIGS. 14 through 19 show flowcharts illustrating methods that support scaling and quantization for CSI reporting in accordance with aspects of the present disclosure.

FIG. 14 shows a flowchart illustrating a method 1400 that supports scaling and quantization for CSI reporting in accordance with aspects of the present disclosure. The operations of the method 1400 may be implemented by an STA or its components as described herein. For example, the operations of the method 1400 may be performed by an STA as described with reference to FIGS. 1-9. In some examples, an STA may execute a set of instructions to control the functional elements of the STA to perform the described functions. Additionally, or alternatively, the STA may perform aspects of the described functions using special-purpose hardware.

At 1405, the method may include receiving a null data packet on a set of multiple subcarriers of a channel. The operations of 1405 may be performed in accordance with examples as disclosed herein. In some examples, aspects of the operations of 1405 may be performed by an NDP manager 825 as described with reference to FIG. 8.

At 1410, the method may include generating a channel state information matrix for each subcarrier of the set of multiple subcarriers of the channel. The operations of 1410 may be performed in accordance with examples as disclosed herein. In some examples, aspects of the operations of 1410 may be performed by a CSI matrix generator 830 as described with reference to FIG. 8.

At 1415, the method may include scaling each value in the channel state information matrix using a power-of-two value based on a determined value in the channel state information matrix. The operations of 1415 may be performed in accordance with examples as disclosed herein. In some examples, aspects of the operations of 1415 may be performed by a scaling manager 835 as described with reference to FIG. 8.

At 1420, the method may include transmitting, to a second device, a channel state information report that includes the scaled values of the channel state information matrix. The operations of 1420 may be performed in accordance with examples as disclosed herein. In some examples, aspects of the operations of 1420 may be performed by a CSI report manager 840 as described with reference to FIG. 8.

Figure 15:
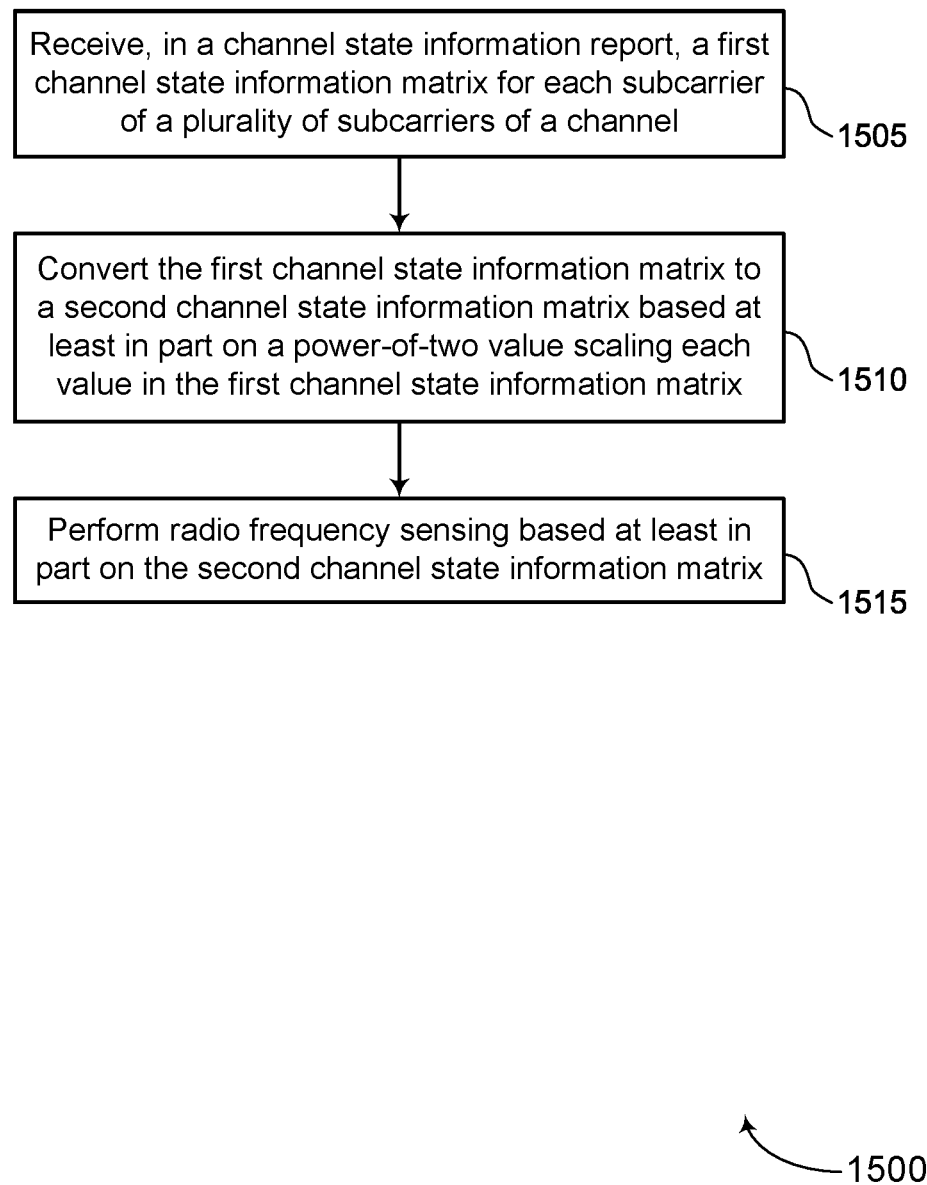

FIG. 15 shows a flowchart illustrating a method 1500 that supports scaling and quantization for CSI reporting in accordance with aspects of the present disclosure. The operations of the method 1500 may be implemented by an STA or an AP or its components as described herein. For example, the operations of the method 1500 may be performed by an STA as described with reference to FIGS. 1-9 or an AP as described with reference to FIGS. 1-5 and 10-13. In some examples, an STA or an AP may execute a set of instructions to control the functional elements of the STA or the AP to perform the described functions. Additionally, or alternatively, the STA or the AP may perform aspects of the described functions using special-purpose hardware.

At 1505, the method may include receiving, in a channel state information report, a first channel state information matrix for each subcarrier of a set of multiple subcarriers of a channel. The operations of 1505 may be performed in accordance with examples as disclosed herein. In some examples, aspects of the operations of 1505 may be performed by a CSI report manager 840 or a CSI report manager 1225 as described with reference to FIGS. 8 and 12.

At 1510, the method may include converting the first channel state information matrix to a second channel state information matrix based on a power-of-two value scaling each value in the first channel state information matrix. The operations of 1510 may be performed in accordance with examples as disclosed herein. In some examples, aspects of the operations of 1510 may be performed by a CSI matrix converter 845 or a CSI matrix converter 1230 as described with reference to FIGS. 8 and 12.

At 1515, the method may include performing radio frequency sensing based on the second channel state information matrix. The operations of 1515 may be performed in accordance with examples as disclosed herein. In some examples, aspects of the operations of 1515 may be performed by an RF sensing manager 850 or an RF sensing manager 1235 as described with reference to FIGS. 8 and 12.

Figure 16:
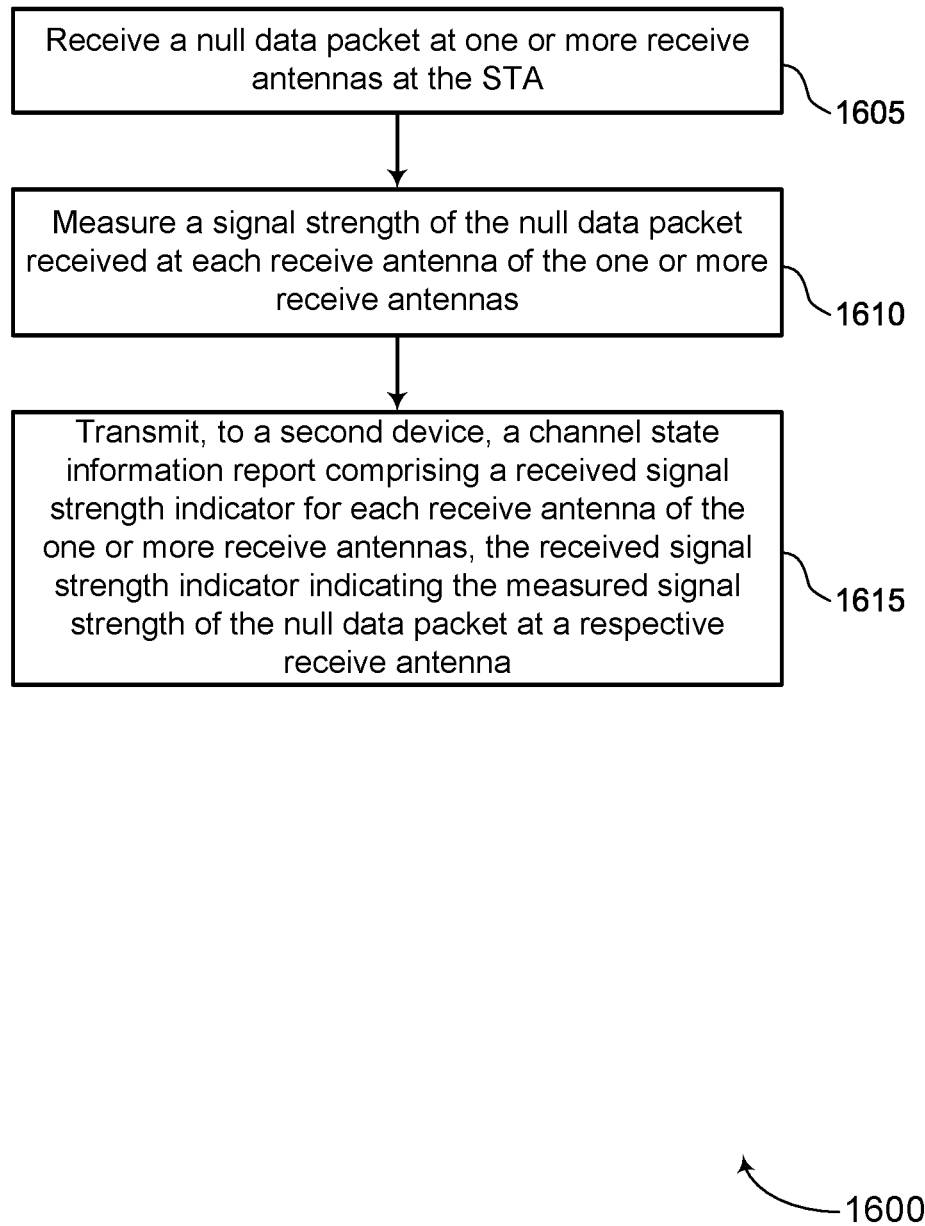

FIG. 16 shows a flowchart illustrating a method 1600 that supports scaling and quantization for CSI reporting in accordance with aspects of the present disclosure. The operations of the method 1600 may be implemented by an STA or its components as described herein. For example, the operations of the method 1600 may be performed by an STA as described with reference to FIGS. 1-9. In some examples, an STA may execute a set of instructions to control the functional elements of the STA to perform the described functions. Additionally, or alternatively, the STA may perform aspects of the described functions using special-purpose hardware.

At 1605, the method may include receiving a null data packet at one or more receive antennas at the STA. The operations of 1605 may be performed in accordance with examples as disclosed herein. In some examples, aspects of the operations of 1605 may be performed by an NDP manager 825 as described with reference to FIG. 8.

At 1610, the method may include measuring a signal strength of the null data packet received at each receive antenna of the one or more receive antennas. The operations of 1610 may be performed in accordance with examples as disclosed herein. In some examples, aspects of the operations of 1610 may be performed by an RSSI manager 855 as described with reference to FIG. 8.

At 1615, the method may include transmitting, to a second device, a channel state information report including a received signal strength indicator for each receive antenna of the one or more receive antennas, the received signal strength indicator indicating the measured signal strength of the null data packet at a respective receive antenna. The operations of 1615 may be performed in accordance with examples as disclosed herein. In some examples, aspects of the operations of 1615 may be performed by an RSSI manager 855 as described with reference to FIG. 8.

Figure 17:
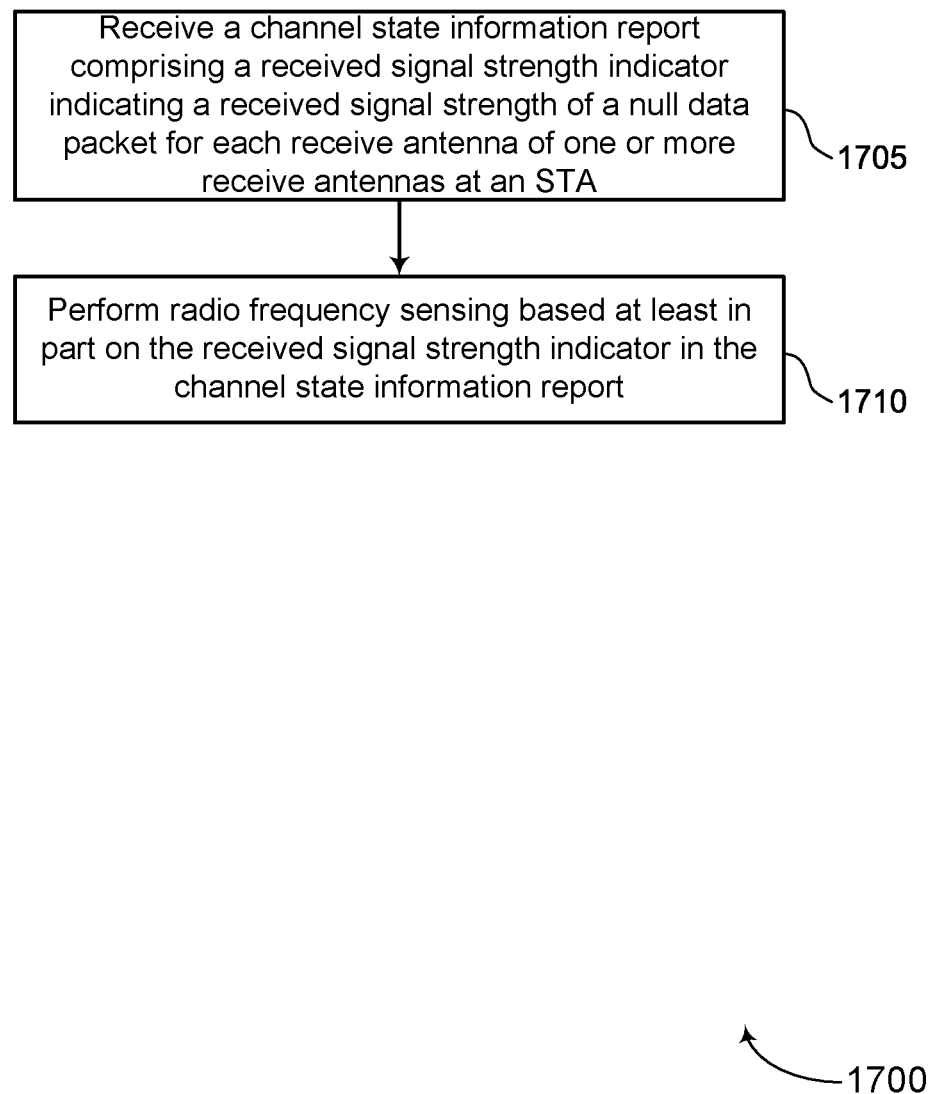

FIG. 17 shows a flowchart illustrating a method 1700 that supports scaling and quantization for CSI reporting in accordance with aspects of the present disclosure. The operations of the method 1700 may be implemented by an STA or an AP or its components as described herein. For example, the operations of the method 1700 may be performed by an STA as described with reference to FIGS. 1-9 or an AP as described with reference to FIGS. 1-5 and 10-13. In some examples, an STA or an AP may execute a set of instructions to control the functional elements of the STA or the AP to perform the described functions. Additionally, or alternatively, the STA or the AP may perform aspects of the described functions using special-purpose hardware.

At 1705, the method may include receiving a channel state information report including a received signal strength indicator indicating a received signal strength of a null data packet for each receive antenna of one or more receive antennas at an STA. The operations of 1705 may be performed in accordance with examples as disclosed herein. In some examples, aspects of the operations of 1705 may be performed by an RSSI manager 855 or an RSSI manager 1240 as described with reference to FIGS. 8 and 12.

At 1710, the method may include performing radio frequency sensing based on the received signal strength indicator in the channel state information report. The operations of 1710 may be performed in accordance with examples as disclosed herein. In some examples, aspects of the operations of 1710 may be performed by an RF sensing manager 850 or an RF sensing manager 1235 as described with reference to FIGS. 8 and 12.

Figure 18:
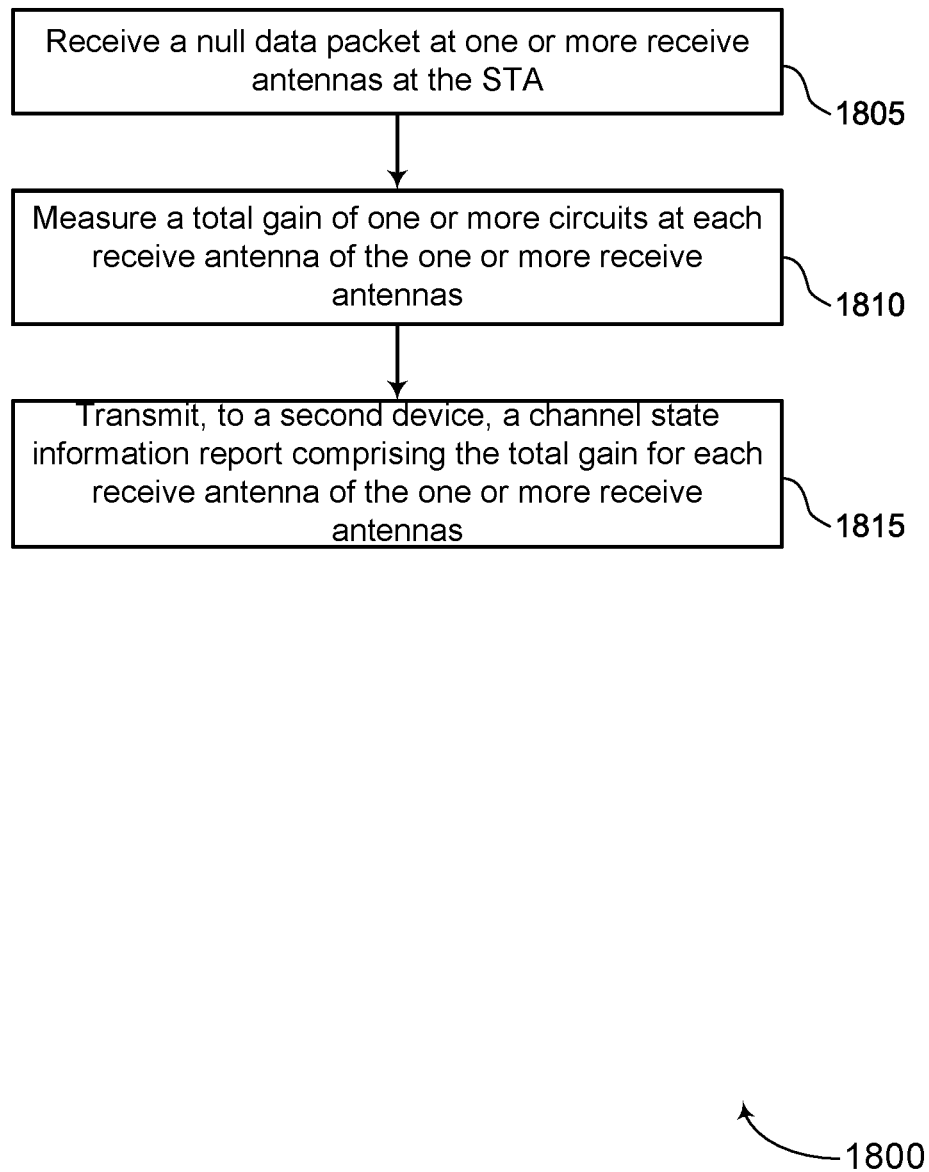

FIG. 18 shows a flowchart illustrating a method 1800 that supports scaling and quantization for CSI reporting in accordance with aspects of the present disclosure. The operations of the method 1800 may be implemented by an STA or its components as described herein. For example, the operations of the method 1800 may be performed by an STA as described with reference to FIGS. 1-9. In some examples, an STA may execute a set of instructions to control the functional elements of the STA to perform the described functions. Additionally, or alternatively, the STA may perform aspects of the described functions using special-purpose hardware.

At 1805, the method may include receiving a null data packet at one or more receive antennas at the STA. The operations of 1805 may be performed in accordance with examples as disclosed herein. In some examples, aspects of the operations of 1805 may be performed by an NDP manager 825 as described with reference to FIG. 8.

At 1810, the method may include measuring a total gain of one or more circuits at each receive antenna of the one or more receive antennas. The operations of 1810 may be performed in accordance with examples as disclosed herein. In some examples, aspects of the operations of 1810 may be performed by a gain manager 860 as described with reference to FIG. 8.

At 1815, the method may include transmitting, to a second device, a channel state information report including the total gain at each receive antenna of the one or more receive antennas. The operations of 1815 may be performed in accordance with examples as disclosed herein. In some examples, aspects of the operations of 1815 may be performed by a gain manager 860 as described with reference to FIG. 8.

Figure 19:
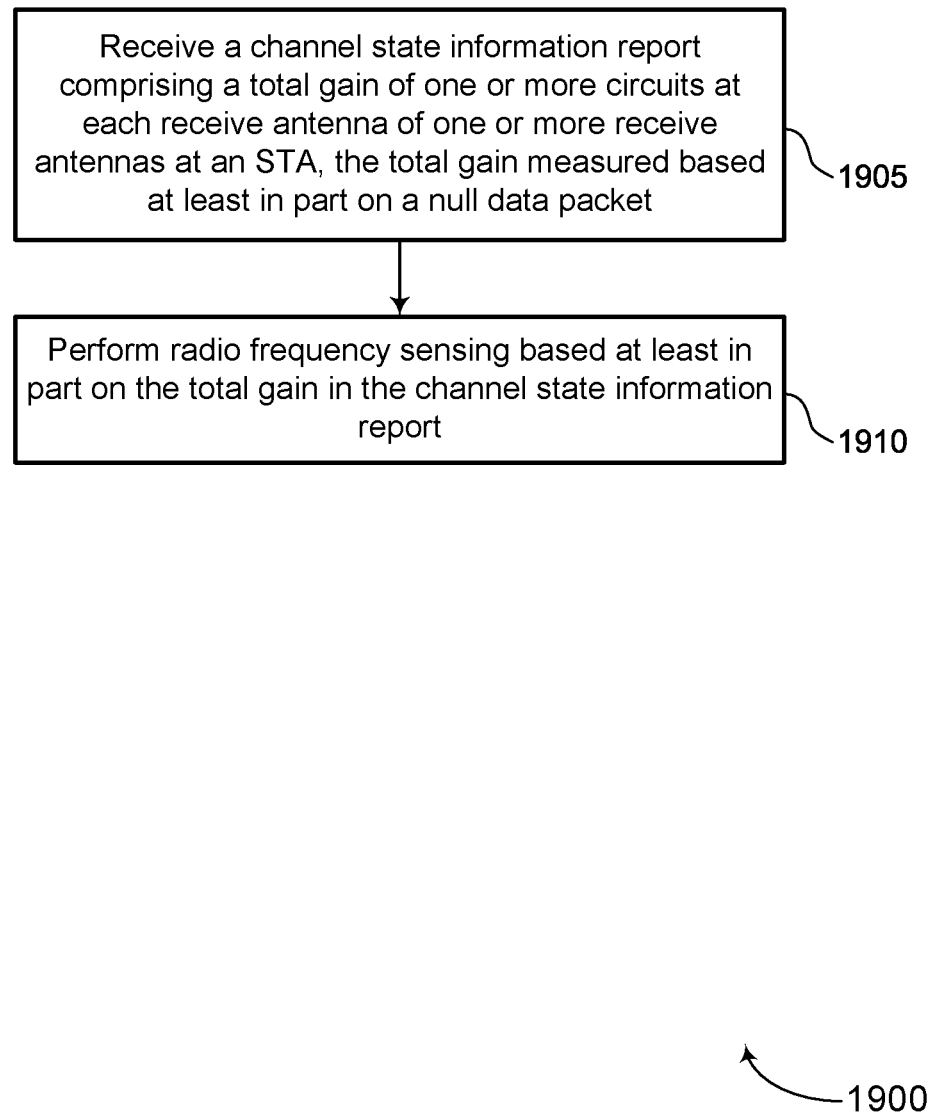

FIG. 19 shows a flowchart illustrating a method 1900 that supports scaling and quantization for CSI reporting in accordance with aspects of the present disclosure. The operations of the method 1900 may be implemented by an STA or an AP or its components as described herein. For example, the operations of the method 1900 may be performed by an STA as described with reference to FIGS. 1-9 or an AP as described with reference to FIGS. 1 through 5 and 10 through 13. In some examples, an STA or an AP may execute a set of instructions to control the functional elements of the STA or the AP to perform the described functions. Additionally, or alternatively, the STA or the AP may perform aspects of the described functions using special-purpose hardware.

At 1905, the method may include receiving a channel state information report including a total gain of one or more circuits at each receive antenna of one or more receive antennas at an STA, the total gain measured based on a null data packet. The operations of 1905 may be performed in accordance with examples as disclosed herein. In some examples, aspects of the operations of 1905 may be performed by a gain manager 860 or a gain manager 1245 as described with reference to FIGS. 8 and 12.

At 1910, the method may include performing radio frequency sensing based on the total gain at each receive antenna in the channel state information report. The operations of 1910 may be performed in accordance with examples as disclosed herein. In some examples, aspects of the operations of 1910 may be performed by an RF sensing manager 850 or an RF sensing manager 1235 as described with reference to FIGS. 8 and 12.

The following provides an overview of aspects of the present disclosure:

Aspect 1: A method for wireless communication at an STA, comprising: receiving a null data packet on a plurality of subcarriers; generating a channel state information matrix for a subcarrier of the plurality of subcarriers; scaling each value in the channel state information matrix using a power-of-two value based at least in part on a determined value in the channel state information matrix; and transmitting, to a second device, a channel state information report that includes the scaled values of the channel state information matrix.

Aspect 2: The method of aspect 1, wherein scaling each value in the channel state information matrix using the power-of-two value comprises: scaling each value in the channel state information matrix using the power-of-two value such that a real and an imaginary part of each scaled value of the channel state information matrix is less than a largest positive value of a binary word having a word size configured for the channel state information matrix and greater than half of the largest positive value of the binary word.

Aspect 3: The method of any of aspects 1 through 2, further comprising: quantizing a real and an imaginary part of each value in the channel state information matrix based at least in part on a word size configured for a format of the channel state information report, wherein transmitting the channel state information report comprises: transmitting the channel state information report that includes the quantized real and imaginary part of each value in the channel state information matrix.

Aspect 4: The method of aspect 3, further comprising: receiving an indication of the word size configured for the format of the channel state information report, wherein quantizing the real and the imaginary part of each value in the channel state information matrix is based at least in part on receiving the indication of the word size.

Aspect 5: The method of any of aspects 1 through 4, further comprising: transmitting, to the second device, an indication of a value for the second device to use to convert the transmitted channel state information matrix to the generated channel state information matrix.

Aspect 6: The method of aspect 5, wherein the value for the second device to use to convert the transmitted channel state information matrix to the generated channel state information matrix is based at least in part on a word size configured for the channel state information matrix, a word size configured for a format of the channel state information report, and the power-of-two value used to scale each value in the channel state information matrix, the second device comprises another STA or an access point.

Aspect 7: The method of any of aspects 1 through 6, wherein scaling each value in the channel state information matrix using the power-of-two value comprises: shifting a real and an imaginary part of each value in the channel state information matrix by the power-of-two value.

Aspect 8: The method of any of aspects 1 through 7, wherein each value in the channel state information matrix comprises a real part and an imaginary part, and the determined value in the channel state information matrix comprises a maximum value of real parts or imaginary parts of values in the channel state information matrix.

Aspect 9: A method for wireless communication, comprising: receiving, in a channel state information report, a first channel state information matrix for a subcarrier of a plurality of subcarriers; converting the first channel state information matrix to a second channel state information matrix based at least in part on a power-of-two value scaling each value in the first channel state information matrix; and performing radio frequency sensing based at least in part on the second channel state information matrix.

Aspect 10: The method of aspect 9, further comprising: transmitting an indication of a word size configured for a format of the channel state information report, wherein each value in the first channel state information matrix is quantized based at least in part on the word size configured for the format of the channel state information report.

Aspect 11: The method of any of aspects 9 through 10, further comprising: receiving an indication of a value for converting the first channel state information matrix to the second channel state information matrix, wherein the converting is based at least in part on receiving the value for converting.

Aspect 12: The method of aspect 11, wherein the value for converting the first channel state information matrix to the second channel state information matrix comprises an exponent of two that is based at least in part on a word size configured for the second channel state information matrix, a word size configured for a format of the channel state information report, and the power-of-two value used to scale each value in the first channel state information matrix.

Aspect 13: The method of any of aspects 9 through 12, wherein each value in the first channel state information matrix and the second channel state information matrix comprises an in-phase value and a quadrature value.

Aspect 14: A method for wireless communication at an STA, comprising: receiving a null data packet at one or more receive antennas at the STA; measuring a signal strength of the null data packet received at each receive antenna of the one or more receive antennas; and transmitting, to a second device, a channel state information report comprising a received signal strength indicator for each receive antenna of the one or more receive antennas, the received signal strength indicator indicating the measured signal strength of the null data packet at a respective receive antenna.

Aspect 15: The method of aspect 14, further comprising: receiving a request to transmit the received signal strength indicator in the channel state information report, wherein transmitting the channel state information report comprising the received signal strength indicator is based at least in part on receiving the request.

Aspect 16: The method of any of aspects 14 through 15, further comprising: measuring a total gain of one or more circuits at each receive antenna of the one or more receive antennas, the method further comprising: transmitting the total gain at each receive antenna in the channel state information report.

Aspect 17: The method of aspect 16, further comprising: receiving a request to transmit the total gain at each receive antenna in the channel state information report, wherein transmitting the total gain at each receive antenna in the channel state information report is based at least in part on receiving the request.

Aspect 18: A method for wireless communication, comprising: receiving a channel state information report comprising a received signal strength indicator indicating a received signal strength of a null data packet for each receive antenna of one or more receive antennas at an STA; and performing radio frequency sensing based at least in part on the received signal strength indicator in the channel state information report.

Aspect 19: The method of aspect 18, further comprising: transmitting a request for the STA to include the received signal strength indicator in the channel state information report, wherein receiving the channel state information report comprising the received signal strength indicator is based at least in part on transmitting the request.

Aspect 20: The method of any of aspects 18 through 19, further comprising: receiving, in the channel state information report, a total gain of one or more circuits at each receive antenna of the one or more receive antennas at the STA.

Aspect 21: The method of aspect 20, further comprising: transmitting a request for the STA to include the total gain at each receive antenna in the channel state information report, wherein receiving the total gain at each receive antenna in the channel state information report is based at least in part on transmitting the request.

Aspect 22: A method for wireless communication at an STA, comprising: receiving a null data packet at one or more receive antennas at the STA; measuring a total gain of one or more circuits at each receive antenna of the one or more receive antennas; and transmitting, to a second device, a channel state information report comprising the total gain at each receive antenna of the one or more receive antennas.

Aspect 23: The method of aspect 22, further comprising: receiving a request to transmit the total gain at each receive antenna in the channel state information report, wherein transmitting the total gain at each receive antenna in the channel state information report is based at least in part on receiving the request.

Aspect 24: The method of any of aspects 22 through 23, further comprising: measuring a received signal strength of the null data packet received at each receive antenna of the one or more receive antennas, the method further comprising: transmitting a received signal strength indicator in the channel state information report indicating the received signal strength of the null data packet received at each receive antenna of the one or more receive antennas.

Aspect 25: The method of aspect 24, further comprising: receiving a request to transmit the received signal strength indicator in the channel state information report, wherein transmitting the received signal strength indicator in the channel state information report is based at least in part on receiving the request.

Aspect 26: A method for wireless communication, comprising: receiving a channel state information report comprising a total gain of one or more circuits at each receive antenna of one or more receive antennas at an STA, the total gain measured based at least in part on a null data packet; and performing radio frequency sensing based at least in part on the total gain at each receive antenna in the channel state information report.

Aspect 27: The method of aspect 26, further comprising: transmitting a request for the STA to include the total gain at each receive antenna in the channel state information report, wherein receiving the channel state information report comprising the total gain is based at least in part on transmitting the request.

Aspect 28: The method of any of aspects 26 through 27, wherein receiving the channel state information report comprises: receiving, in the channel state information report, a received signal strength indicator indicating a received signal strength of the null data packet at each receive antenna of the one or more receive antennas at the STA.

Aspect 29: The method of aspect 28, further comprising: transmitting a request for the STA to include the received signal strength indicator in the channel state information report, wherein receiving the received signal strength indicator in the channel state information report is based at least in part on transmitting the request.

Aspect 30: An apparatus for wireless communication at an STA, comprising a processor; memory coupled with the processor; and instructions stored in the memory and executable by the processor to cause the apparatus to perform a method of any of aspects 1 through 8.

Aspect 31: An apparatus for wireless communication at an STA, comprising at least one means for performing a method of any of aspects 1 through 8.

Aspect 32: A non-transitory computer-readable medium storing code for wireless communication at an STA, the code comprising instructions executable by a processor to perform a method of any of aspects 1 through 8.

Aspect 33: An apparatus for wireless communication, comprising a processor; memory coupled with the processor; and instructions stored in the memory and executable by the processor to cause the apparatus to perform a method of any of aspects 9 through 13.

Aspect 34: An apparatus for wireless communication, comprising at least one means for performing a method of any of aspects 9 through 13.

Aspect 35: A non-transitory computer-readable medium storing code for wireless communication, the code comprising instructions executable by a processor to perform a method of any of aspects 9 through 13.

Aspect 36: An apparatus for wireless communication at an STA, comprising a processor; memory coupled with the processor; and instructions stored in the memory and executable by the processor to cause the apparatus to perform a method of any of aspects 14 through 17.

Aspect 37: An apparatus for wireless communication at an STA, comprising at least one means for performing a method of any of aspects 14 through 17.

Aspect 38: A non-transitory computer-readable medium storing code for wireless communication at an STA, the code comprising instructions executable by a processor to perform a method of any of aspects 14 through 17.

Aspect 39: An apparatus for wireless communication, comprising a processor; memory coupled with the processor; and instructions stored in the memory and executable by the processor to cause the apparatus to perform a method of any of aspects 18 through 21.

Aspect 40: An apparatus for wireless communication, comprising at least one means for performing a method of any of aspects 18 through 21.

Aspect 41: A non-transitory computer-readable medium storing code for wireless communication, the code comprising instructions executable by a processor to perform a method of any of aspects 18 through 21.

Aspect 42: An apparatus for wireless communication at an STA, comprising a processor; memory coupled with the processor; and instructions stored in the memory and executable by the processor to cause the apparatus to perform a method of any of aspects 22 through 25.

Aspect 43: An apparatus for wireless communication at an STA, comprising at least one means for performing a method of any of aspects 22 through 25.

Aspect 44: A non-transitory computer-readable medium storing code for wireless communication at an STA, the code comprising instructions executable by a processor to perform a method of any of aspects 22 through 25.

Aspect 45: An apparatus for wireless communication, comprising a processor; memory coupled with the processor; and instructions stored in the memory and executable by the processor to cause the apparatus to perform a method of any of aspects 26 through 29.

Aspect 46: An apparatus for wireless communication, comprising at least one means for performing a method of any of aspects 26 through 29.

Aspect 47: A non-transitory computer-readable medium storing code for wireless communication, the code comprising instructions executable by a processor to perform a method of any of aspects 26 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a station (STA), comprising:
   receiving a null data packet on a plurality of subcarriers of a channel;
   generating a channel state information matrix for each subcarrier of the plurality of subcarriers of the channel;
   scaling each value in the channel state information matrix using a power-of-two value based at least in part on a determined value in the channel state information matrix, wherein each value in the channel state information matrix is scaled such that a real part and an imaginary part of each scaled value of the channel state information matrix is less than a largest positive value of a binary word having a word size configured for the channel state information matrix and greater than half of the largest positive value of the binary word; and
   transmitting, to a second device, a channel state information report that includes the scaled values of the channel state information matrix.

2. The method of claim 1, further comprising quantizing a real and an imaginary part of each value in the channel state information matrix based at least in part on a word size configured for a format of the channel state information report, wherein transmitting the channel state information report comprises transmitting the channel state information report that includes the quantized real and imaginary part of each value in the channel state information matrix.

3. The method of claim 2, further comprising receiving an indication of the word size configured for the format of the channel state information report, wherein quantizing the real and the imaginary part of each value in the channel state information matrix is based at least in part on receiving the indication of the word size.

4. The method of claim 1, further comprising transmitting, to the second device, an indication of a value for the second device to use to convert the transmitted channel state information matrix to the generated channel state information matrix.

5. The method of claim 4, wherein the value for the second device to use to convert the transmitted channel state information matrix to the generated channel state information matrix is based at least in part on a word size configured for the channel state information matrix, a word size configured for a format of the channel state information report, and the power-of-two value used to scale each value in the channel state information matrix, wherein the second device comprises another STA or an access point.

6. The method of claim 1, wherein scaling each value in the channel state information matrix using the power-of-two value comprises shifting a real and an imaginary part of each value in the channel state information matrix by the power-of-two value.

7. The method of claim 1, wherein each value in the channel state information matrix comprises a real part and an imaginary part, and the determined value in the channel state information matrix comprises a maximum value of real parts or imaginary parts of values in the channel state information matrix.

8. A method for wireless communication, comprising:
   transmitting an indication of a word size configured for a format of a channel state information report, wherein each value in a first channel state information matrix is quantized based at least in part on the word size configured for the format of the channel state information report;

receiving, in the channel state information report, the first channel state information matrix for each subcarrier of a plurality of subcarriers of a channel;

converting the first channel state information matrix to a second channel state information matrix based at least in part on a power-of-two value scaling each value in the first channel state information matrix; and performing radio frequency sensing based at least in part on the second channel state information matrix.

9. The method of claim 8, further comprising receiving an indication of a value for converting the first channel state information matrix to the second channel state information matrix, wherein the converting is based at least in part on receiving the value for converting.

10. The method of claim 9, wherein the value for converting the first channel state information matrix to the second channel state information matrix comprises an exponent of two that is based at least in part on a word size configured for the second channel state information matrix, the word size configured for the format of the channel state information report, and the power-of-two value used to scale each value in the first channel state information matrix.

11. The method of claim 8, wherein each value in the first channel state information matrix and the second channel state information matrix comprises an in-phase value and a quadrature value.

12. A method for wireless communication at a station (STA), comprising:

receiving a null data packet at one or more receive antennas at the STA;

measuring a signal strength of the null data packet received at each receive antenna of the one or more receive antennas;

receiving a request to transmit a received signal strength indicator in a channel state information report; and transmitting, to a second device and based at least in part on receiving the request, the channel state information report comprising the received signal strength indicator for each receive antenna of the one or more receive antennas, the received signal strength indicator indicating the measured signal strength of the null data packet at a respective receive antenna.

13. The method of claim 12, further comprising:

measuring a total gain of one or more circuits at each receive antenna of the one or more receive antennas, the method further comprising:

transmitting the total gain at each receive antenna in the channel state information report.

14. The method of claim 13, further comprising receiving a request to transmit the total gain at each receive antenna in the channel state information report, wherein transmitting the total gain at each receive antenna in the channel state information report is based at least in part on receiving the request.

15. A method for wireless communication, comprising:

transmitting a request for a station (STA) to include a received signal strength indicator in a channel state information report;

receiving, based at least in part on transmitting the request, the channel state information report comprising the received signal strength indicator indicating a received signal strength of a null data packet for each receive antenna of one or more receive antennas at the STA; and performing radio frequency sensing based at least in part on the received signal strength indicator in the channel state information report.

16. The method of claim 15, further comprising receiving, in the channel state information report, a total gain of one or more circuits at each receive antenna of the one or more receive antennas at the STA.

17. The method of claim 16, further comprising transmitting a request for the STA to include the total gain at each receive antenna in the channel state information report, wherein receiving the total gain at each receive antenna in the channel state information report is based at least in part on transmitting the request.

18. A method for wireless communication at a station (STA), comprising:

receiving a null data packet at one or more receive antennas at the STA;

measuring a total gain of one or more circuits at each receive antenna of the one or more receive antennas; and transmitting, to a second device, a channel state information report comprising the total gain at each receive antenna of the one or more receive antennas.

19. The method of claim 18, further comprising receiving a request to transmit the total gain at each receive antenna in the channel state information report, wherein transmitting the total gain at each receive antenna in the channel state information report is based at least in part on receiving the request.

20. The method of claim 18, further comprising:

measuring a received signal strength of the null data packet received at each receive antenna of the one or more receive antennas, the method further comprising:

transmitting a received signal strength indicator in the channel state information report indicating the received signal strength of the null data packet received at each receive antenna of the one or more receive antennas.

21. The method of claim 20, further comprising receiving a request to transmit the received signal strength indicator in the channel state information report, wherein transmitting the received signal strength indicator in the channel state information report is based at least in part on receiving the request.

22. A method for wireless communication, comprising:

receiving a channel state information report comprising a total gain of one or more circuits at each receive antenna of one or more receive antennas at a station (STA), the total gain measured based at least in part on a null data packet; and performing radio frequency sensing based at least in part on the total gain at each receive antenna in the channel state information report.

23. The method of claim 22, further comprising transmitting a request for the STA to include the total gain at each receive antenna in the channel state information report, wherein receiving the channel state information report comprising the total gain is based at least in part on transmitting the request.

24. The method of claim 22, wherein receiving the channel state information report comprises receiving, in the channel state information report, a received signal strength indicator indicating a received signal strength of the null data packet at each receive antenna of the one or more receive antennas at the STA.

25. The method of claim 24, further comprising transmitting a request for the STA to include the received signal strength indicator in the channel state information report, wherein receiving the received signal strength indicator in the channel state information report is based at least in part on transmitting the request.

26. An apparatus for wireless communication at a station (STA), comprising:
a processor;
memory coupled with the processor; and
instructions stored in the memory and executable by the processor to cause the apparatus to:
receive a null data packet on a plurality of subcarriers of a channel;
generate a channel state information matrix for each subcarrier of the plurality of subcarriers of the channel;
scale each value in the channel state information matrix using a power-of-two value based at least in part on a determined value in the channel state information matrix, wherein each value in the channel state information matrix is scaled such that a real part and an imaginary part of each scaled value of the channel state information matrix is less than a largest positive value of a binary word having a word size configured for the channel state information matrix and greater than half of the largest positive value of the binary word; and
transmit, to a second device, a channel state information report that includes the scaled values of the channel state information matrix.

27. The apparatus of claim 26, wherein the instructions are further executable by the processor to cause the apparatus to:
quantize a real and an imaginary part of each value in the channel state information matrix based at least in part on a word size configured for a format of the channel state information report, wherein the instructions to transmit the channel state information report are executable by the processor to cause the apparatus to:
transmit the channel state information report that includes the quantized real and imaginary part of each value in the channel state information matrix.

28. The apparatus of claim 27, wherein the instructions are further executable by the processor to cause the apparatus to receive an indication of the word size configured for the format of the channel state information report, wherein quantizing the real and the imaginary part of each value in the channel state information matrix is based at least in part on receiving the indication of the word size.

29. The apparatus of claim 26, wherein the instructions are further executable by the processor to cause the apparatus to transmit, to the second device, an indication of a value for the second device to use to convert the transmitted channel state information matrix to the generated channel state information matrix.

30. The apparatus of claim 29, wherein the value for the second device to use to convert the transmitted channel state information matrix to the generated channel state information matrix is based at least in part on a word size configured for the channel state information matrix, a word size configured for a format of the channel state information report, and the power-of-two value used to scale each value in the channel state information matrix, wherein the second device comprises another STA or an access point.

31. The apparatus of claim 26, wherein the instructions to scale each value in the channel state information matrix using the power-of-two value are executable by the processor to cause the apparatus to shift a real and an imaginary part of each value in the channel state information matrix by the power-of-two value.

32. The apparatus of claim 26, wherein each value in the channel state information matrix comprises a real part and an imaginary part, and the determined value in the channel state information matrix comprises a maximum value of real parts or imaginary parts of values in the channel state information matrix.

33. An apparatus for wireless communication, comprising:
a processor;
memory coupled with the processor; and
instructions stored in the memory and executable by the processor to cause the apparatus to:
transmit an indication of a word size configured for a format of a channel state information report, wherein each value in a first channel state information matrix is quantized based at least in part on the word size configured for the format of the channel state information report;
receive, in the channel state information report, the first channel state information matrix for each subcarrier of a plurality of subcarriers of a channel;
convert the first channel state information matrix to a second channel state information matrix based at least in part on a power-of-two value scaling each value in the first channel state information matrix; and
perform radio frequency sensing based at least in part on the second channel state information matrix.

34. The apparatus of claim 33, wherein the instructions are further executable by the processor to cause the apparatus to receive an indication of a value for converting the first channel state information matrix to the second channel state information matrix, wherein the converting is based at least in part on receiving the value for converting.

35. The apparatus of claim 34, wherein the value for converting the first channel state information matrix to the second channel state information matrix comprises an exponent of two that is based at least in part on a word size configured for the second channel state information matrix, the word size configured for the format of the channel state information report, and the power-of-two value used to scale each value in the first channel state information matrix.

36. The apparatus of claim 33, wherein each value in the first channel state information matrix and the second channel state information matrix comprises an in-phase value and a quadrature value.

37. An apparatus for wireless communication at a station (STA), comprising:
a processor;
memory coupled with the processor; and
instructions stored in the memory and executable by the processor to cause the apparatus to:
receive a null data packet at one or more receive antennas at the STA;
measure a signal strength of the null data packet received at each receive antenna of the one or more receive antennas;
receive a request to transmit a received signal strength indicator in a channel state information report; and
transmit, to a second device and based at least in part on receiving the request, the channel state information report comprising the received signal strength indicator for each receive antenna of the one or more receive antennas, the received signal strength indicator indicating the measured signal strength of the null data packet at a respective receive antenna.

38. The apparatus of claim 37, wherein the instructions are further executable by the processor to cause the apparatus to:
measure a total gain of one or more circuits at each receive antenna of the one or more receive antennas, wherein the instructions are further executable by the processor to:
transmit the total gain at each receive antenna in the channel state information report.

39. The apparatus of claim 38, wherein the instructions are further executable by the processor to cause the apparatus to receive a request to transmit the total gain at each receive antenna in the channel state information report, wherein transmitting the total gain at each receive antenna in the channel state information report is based at least in part on receiving the request.

40. An apparatus for wireless communication, comprising:
a processor;
memory coupled with the processor; and
instructions stored in the memory and executable by the processor to cause the apparatus to:
transmit a request for a station (STA) to include a received signal strength indicator in a channel state information report;
receive, based at least in part on transmitting the request, the channel state information report comprising the received signal strength indicator indicating a received signal strength of a null data packet for each receive antenna of one or more receive antennas at the STA; and
perform radio frequency sensing based at least in part on the received signal strength indicator in the channel state information report.

41. The apparatus of claim 40, wherein the instructions are further executable by the processor to cause the apparatus to receive, in the channel state information report, a total gain of one or more circuits at each receive antenna of the one or more receive antennas at the STA.

42. The apparatus of claim 41, wherein the instructions are further executable by the processor to cause the apparatus to transmit a request for the STA to include the total gain at each receive antenna in the channel state information report, wherein receiving the total gain at each receive antenna in the channel state information report is based at least in part on transmitting the request.

43. An apparatus for wireless communication at a station (STA), comprising:
a processor;
memory coupled with the processor; and
instructions stored in the memory and executable by the processor to cause the apparatus to:
receive a null data packet at one or more receive antennas at the STA;
measure a total gain of one or more circuits at each receive antenna of the one or more receive antennas; and
transmit, to a second device, a channel state information report comprising the total gain at each receive antenna of the one or more receive antennas.

44. The apparatus of claim 43, wherein the instructions are further executable by the processor to cause the apparatus to receive a request to transmit the total gain at each receive antenna in the channel state information report, wherein transmitting the total gain at each receive antenna in the channel state information report is based at least in part on receiving the request.

45. The apparatus of claim 43, wherein the instructions are further executable by the processor to cause the apparatus to:
measure a received signal strength of the null data packet received at each receive antenna of the one or more receive antennas, wherein the instructions are further executable by the processor to cause the apparatus to:
transmit a received signal strength indicator in the channel state information report indicating the received signal strength of the null data packet received at each receive antenna of the one or more receive antennas.

46. The apparatus of claim 45, wherein the instructions are further executable by the processor to cause the apparatus to receive a request to transmit the received signal strength indicator in the channel state information report, wherein transmitting the received signal strength indicator in the channel state information report is based at least in part on receiving the request.

47. An apparatus for wireless communication, comprising:
a processor;
memory coupled with the processor; and
instructions stored in the memory and executable by the processor to cause the apparatus to:
receive a channel state information report comprising a total gain of one or more circuits at each receive antenna of one or more receive antennas at a station (STA), the total gain measured based at least in part on a null data packet; and
perform radio frequency sensing based at least in part on the total gain at each receive antenna in the channel state information report.

48. The apparatus of claim 47, wherein the instructions are further executable by the processor to cause the apparatus to transmit a request for the STA to include the total gain at each receive antenna in the channel state information report, wherein receiving the channel state information report comprising the total gain is based at least in part on transmitting the request.

49. The apparatus of claim 47, wherein the instructions to receive the channel state information report are executable by the processor to cause the apparatus to receive, in the channel state information report, a received signal strength indicator indicating a received signal strength of the null data packet at each receive antenna of the one or more receive antennas at the STA.

50. The apparatus of claim 49, wherein the instructions are further executable by the processor to cause the apparatus to transmit a request for the STA to include the received signal strength indicator in the channel state information report, wherein receiving the received signal strength indicator in the channel state information report is based at least in part on transmitting the request.

* * * * *